United States Patent
Kuwabara

(10) Patent No.: US 11,079,898 B2
(45) Date of Patent: Aug. 3, 2021

(54) ELECTRONIC DEVICE FOR CONTROLLING DISPLAY OF VR IMAGE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Yasuhiro Kuwabara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/821,414

(22) Filed: Mar. 17, 2020

(65) Prior Publication Data
US 2020/0301565 A1    Sep. 24, 2020

(30) Foreign Application Priority Data
Mar. 20, 2019    (JP) .............................. JP2019-052902

(51) Int. Cl.
*G06F 3/0481* (2013.01)
*G02B 27/01* (2006.01)
*G06F 3/041* (2006.01)

(52) U.S. Cl.
CPC ..... *G06F 3/04815* (2013.01); *G02B 27/0172* (2013.01); *G02B 27/0179* (2013.01); *G06F 3/0416* (2013.01); *G02B 2027/0178* (2013.01)

(58) Field of Classification Search
CPC ............ G02B 27/0172; G02B 27/0179; G02B 2027/0187; G02B 2027/0178; G06F 3/0416; G06F 3/04815; G06F 3/011; G06F 3/0485; G06F 3/0488
See application file for complete search history.

(56) References Cited

U.S. PATENT DOCUMENTS

2020/0334893 A1* 10/2020 Jiang ...................... G06F 3/013

FOREIGN PATENT DOCUMENTS

JP         2018-165985 A    10/2018

* cited by examiner

*Primary Examiner* — Deeprose Subedi
(74) *Attorney, Agent, or Firm* — Cowan, Liebowitz & Latman, P.C.

(57) ABSTRACT

An electronic device comprising: a determining unit configured to determine a display direction based on a movement distance of a touch position or an amount of a change in a posture of the electronic device; and a display control unit configured to control a display unit to display a partial region of a VR image in accordance with the display direction determined based on the movement distance of the touch position if the display direction determined based on the movement distance of the touch position is smaller than the predetermined angle and control the display unit to change over to another VR image and display another VR image instead of displaying the partial region of the VR image if the display direction determined based on the movement distance of the touch position is larger than the predetermined angle.

12 Claims, 16 Drawing Sheets

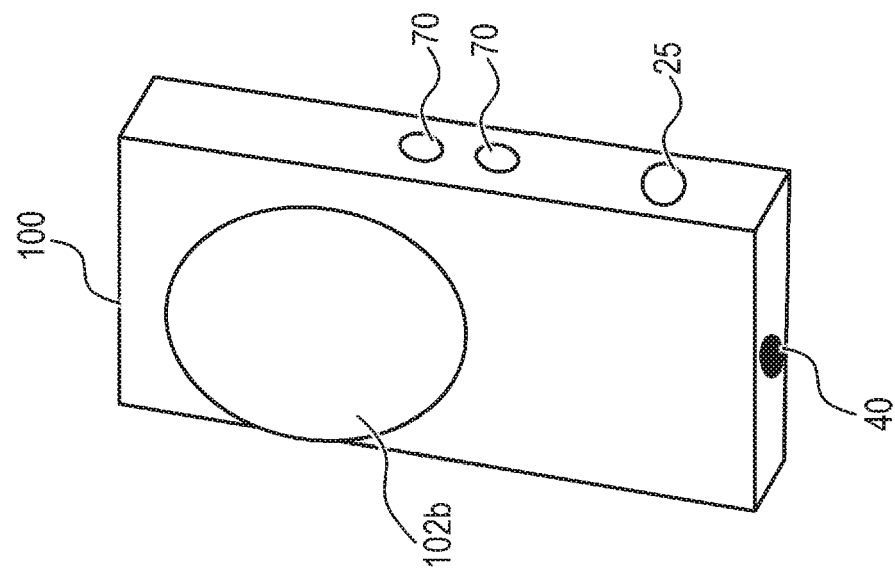
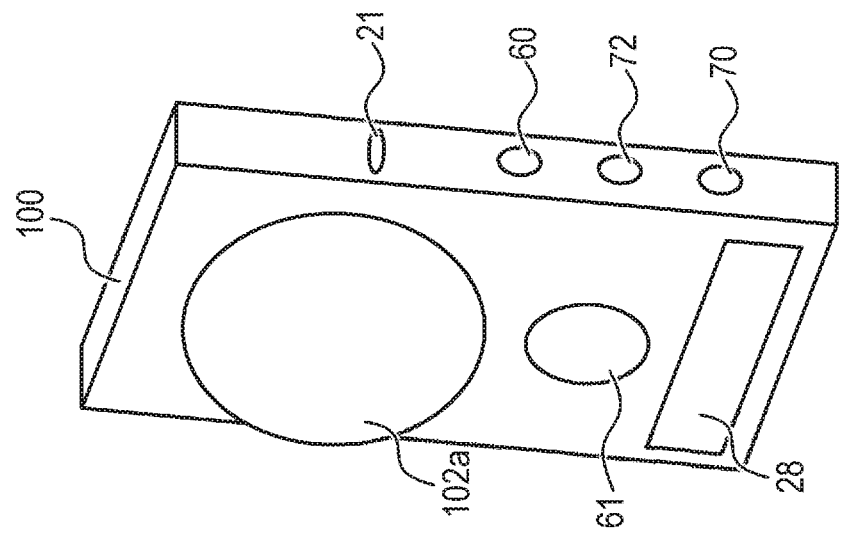

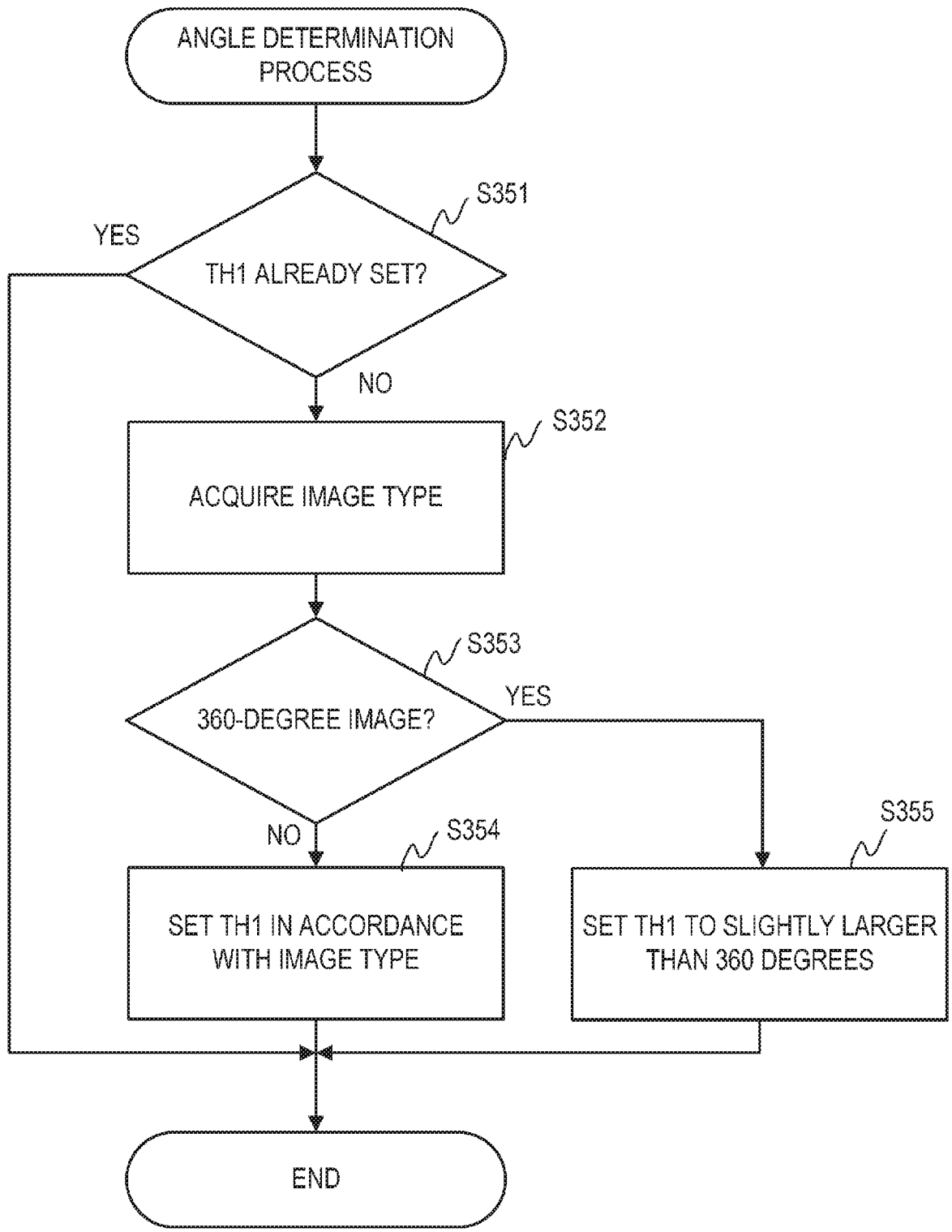

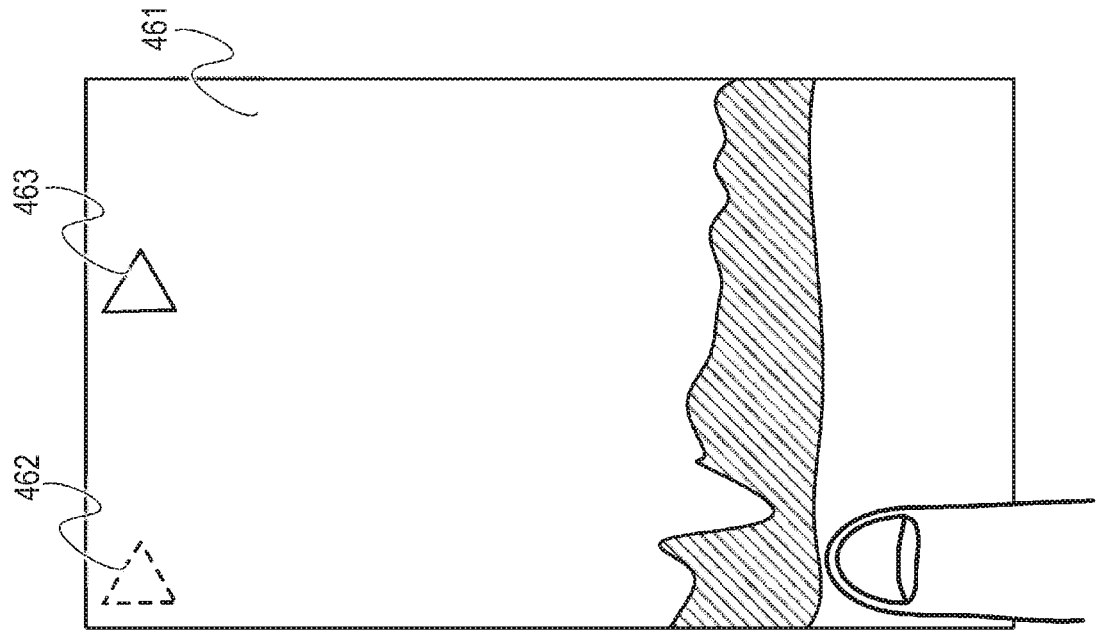
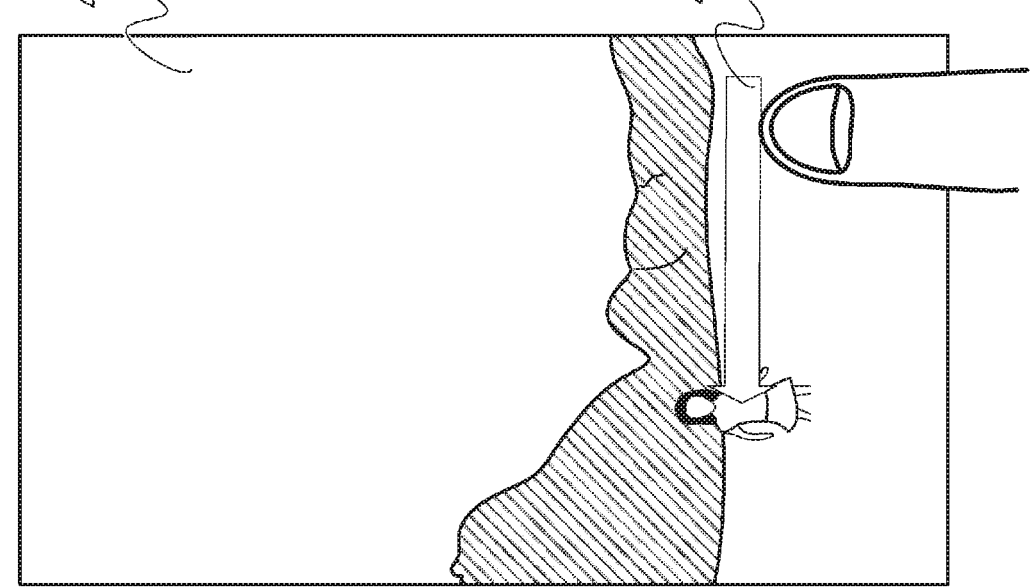

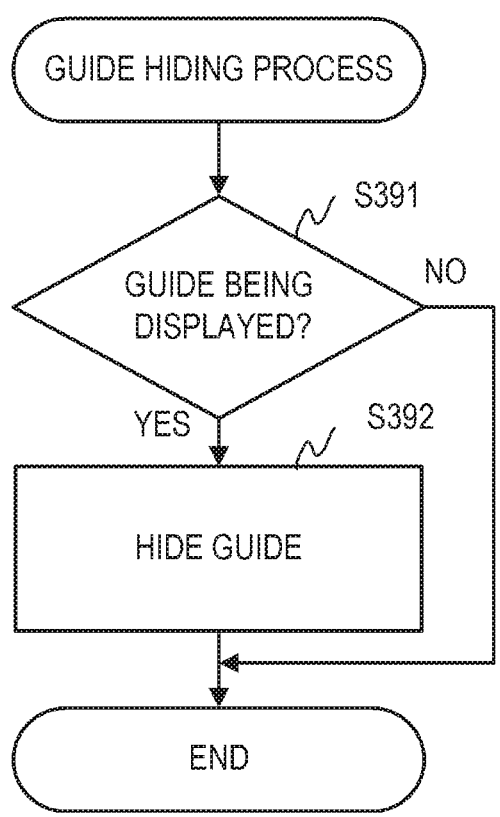

ELECTRONIC DEVICE FOR CONTROLLING DISPLAY OF VR IMAGE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device for controlling display of a VR image, a control method of the electronic device, and a non-transitory computer readable medium.

Description of the Related Art

In recent years, image capturing apparatuses capable of photographing an image (a VR image: a video) having a range that is wider than a human viewing angle such as an omnidirectional image or a fully celestial image are becoming popular. Methods are also known for performing display (VR display) with a high sense of immersion or a high sense of realism by displaying a part of an image having such a wide range on a display and changing a range (a display range) of the image to be displayed on the display so as to follow a change in a posture of an image capturing apparatus. In addition, it is also known that, in addition to the posture of the apparatus, a VR display range may be changed in accordance with an operation input by a user or by displaying a separate UI (an operation member) on a screen.

Japanese Patent Application Laid-open No. 2018-165985 discloses a technique for controlling a display range of a VR image by a posture of a head mounted display and an input device.

In this case, in addition to changing a display range, operations related to display of a VR image include changing the VR image to be displayed (changing over the VR image to be displayed to another VR image).

However, while Japanese Patent Application Laid-open No. 2018-165985 describes a technique for changing the display range of a VR image by an input apparatus and a line-of-sight movement, there is no mention of changing over the VR image to be displayed to another VR image.

In other words, conventionally, changing a display range of a VR image and changing over the VR image to be displayed to another VR image required a user to change operation screens and the like and operations were not easy.

SUMMARY OF THE INVENTION

An object of the present invention is to streamline user operations when performing operations for both changing a display range of a VR image and changing over the VR image to be displayed to another VR image.

A first aspect of the invention of the present disclosure is:
an electronic device configured to display a VR image on a display unit, the electronic device having a memory and at least one processor and/or at least one circuit to perform the operations of the following units:
an operating unit configured to accept a user operation for moving touch position on the display unit:
a posture detection unit configured to detect a change in a posture of the electronic device;
a determining unit configured to determine a display direction based on a movement distance of the touch position or an amount of the change in the posture of the electronic device; and
a display control unit configured to 1) control the display unit to display a partial region of a VR image in accordance with the display direction determined based on the amount of the change in the posture of the electronic device regardless of whether the display direction determined based on the amount of the change in the posture of the electronic device is larger than a predetermined angle or not, 2) control the display unit to display the partial region of the VR image in accordance with the display direction determined based on the movement distance of the touch position if the display direction determined based on the movement distance of the touch position is smaller than the predetermined angle and 3) control the display unit to change over to another VR image and display another VR image instead of displaying the partial region of the VR image if the display direction determined based on the movement distance of the touch position is larger than the predetermined angle.

A second aspect of the invention of the present disclosure is:
a method of controlling an electronic device that displays a VR image on a display unit, the method comprising:
a step of accepting a user operation for moving touch position on the display unit;
a step of detecting a change in a posture of the electronic device;
a step of determining a display direction based on a movement distance of the touch position or an amount of the change in the posture of the electronic device; and
a step of 1) controlling the display unit to display a partial region of a VR image in accordance with the display direction determined based on the amount of the change in the posture of the electronic device regardless of whether the display direction determined based on the amount of the change in the posture of the electronic device is larger than a predetermined angle or not, 2) controlling the display unit to display the partial region of the VR image in accordance with the display direction determined based on the movement distance of the touch position if the display direction determined based on the movement distance of the touch position is smaller than the predetermined angle and 3) controlling the display unit to change over to another VR image and display another VR image instead of displaying the partial region of the VR image if the display direction determined based on the movement distance of the touch position is larger than the predetermined angle.

Further features of the present invention will become apparent from the following description of exemplary embodiments with reference to the attached drawings.

BRIEF DESCRIPTION OF THE DRAWINGS

FIGS. 1A and 1B are external views of a digital camera;
FIG. 8A is a flow chart showing an angle determination process;
FIGS. 9A and 9B are diagrams illustrating a guide display.

FIG. 13A is a flow chart showing a guide hiding process; and

DESCRIPTION OF THE EMBODIMENTS

Figure 2:
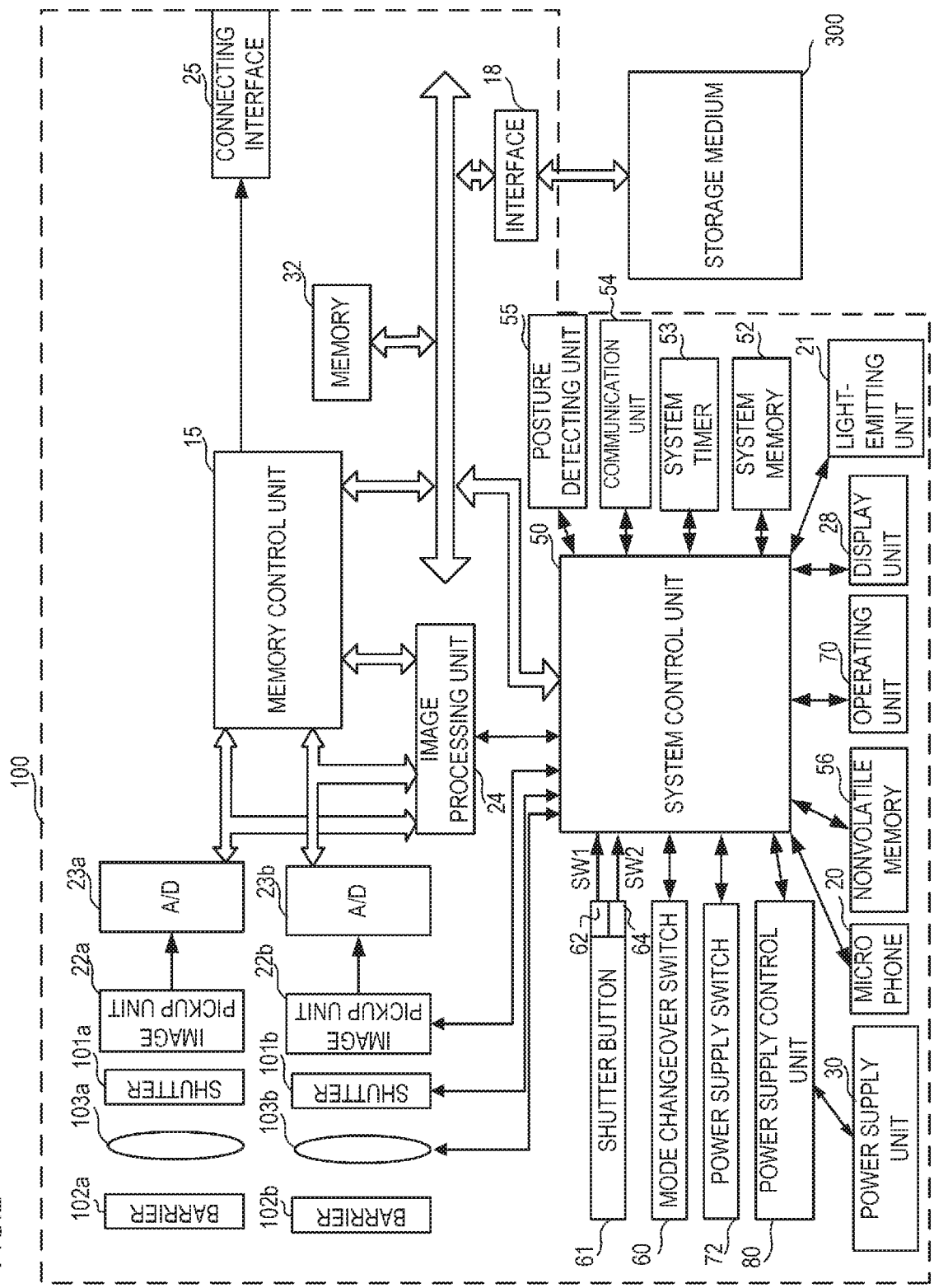
FIG. 2 is a block diagram of the digital camera.

Hereinafter, a preferred embodiment of the present invention will be described with reference to the drawings.

Embodiment

In the present embodiment, an electronic device will be described which displays a region of a VR image on a display unit in accordance with a display direction based on a movement angle from a reference direction in a VR space. The electronic device is capable of accepting a prescribed user operation for changing the display direction and a change in attitude of the electronic device. In addition, by determining a movement angle (a display direction) on the basis of the user operation or a change in the posture of the electronic device, the electronic device determines a region of a VR image to be displayed. Furthermore, when the user operation is performed, the electronic device changes over the VR image to be displayed to another VR image if a value of the movement angle is larger than a prescribed angle. According to the present embodiment, since a process of changing a display range of a VR image and a process of changing over (changing) a VR image to be displayed to another VR image can be performed by a same user operation, a user can more readily perform the two processes (operations).

External View of Digital Camera

First, a digital camera 100 which is an apparatus for photographing a VR image will be described. FIG. 1A is a front perspective view (an external view) of the digital camera 100 (an image pickup apparatus) which is an electronic device. FIG. 1B shows a rear perspective view (an external view) of the digital camera 100. The digital camera 100 is an omnidirectional camera (a fully celestial camera).

In addition, in the present embodiment, it is assumed that the digital camera 100 is constituted by a "camera unit a" and a "camera unit b" respectively having different photographic ranges. In this case, the "camera unit a" is a wide-angle camera having a wide range of 180 vertical and horizontal degrees or more on a front side of the digital camera 100 as a photography range. In addition, the "camera unit b" is a wide-angle camera having a wide range of 180 vertical and horizontal degrees or more on a rear side of the digital camera 100 as a photography range.

A barrier 102a is a protective window of a photographic lens 103a for the "camera unit a" having the front of the digital camera 100 as a photography range. Alternatively, the barrier 102a may be an outer surface of the photographic lens 103a itself. A barrier 102b is a protective window of a photographic lens 103b for the "camera unit b" having the rear of the digital camera 100 as a photography range. Alternatively, the barrier 102b may be an outer surface of the photographic lens 103b itself.

A display unit 28 is a display unit which displays various types of information. A shutter button 61 is an operating unit for issuing a photography instruction. A mode changeover switch 60 is an operating unit for switching among various modes. A connecting I/F 25 is a connector for connecting, to the digital camera 100, a connecting cable for connecting to external devices such as a smartphone, a personal computer, and a television set. An operating unit 70 is an operating unit constituted by operation members such as various switches, buttons, dials, touch sensors, and the like for receiving various types of operations from the user. A power supply switch 72 is a push button for switching a power supply on and off.

A light-emitting unit 21 is a light-emitting member such as a light-emitting diode (LED) and notifies the user of various states of the digital camera 100 through light emission patterns, light emission colors, or the like. A fixing unit 40 is, for example, a tripod screw hole that is a member to be used to fix and install the digital camera 100 with a fixing tool such as a tripod.

Configuration of Digital Camera

FIG. 2 is a block diagram showing a configuration example of the digital camera 100.

The barrier 102a covers an image pickup system of the "camera unit a" including the photographic lens 103a of the digital camera 100 to prevent the image pickup system including the photographic lens 103a, a shutter 101a, and an image pickup unit 22a from being stained or damaged.

The photographic lens 103a refers to a lens group including a zoom lens and a focusing lens and is a wide-angle lens. The shutter 101a is a shutter equipped with a diaphragm function for adjusting an amount of incidence of subject light into the image pickup unit 22a. The image pickup unit 22a is an image sensing element constituted by a device such as a CCD or a CMOS which converts an optical image into an electrical signal. An A/D converter 23a converts an analog signal output from the image pickup unit 22a into a digital signal.

The barrier 102b covers an image pickup system of the camera unit b including the photographic lens 103b of the digital camera 100 to prevent the image pickup system including the photographic lens 103b, a shutter 101b, and an image pickup unit 22b from being stained or damaged.

The photographic lens 103b refers to a lens group including a zoom lens and a focusing lens and is a wide-angle lens. The shutter 101b is a shutter equipped with a diaphragm function for adjusting an amount of incidence of subject light into the image pickup unit 22b. The image pickup unit 22b is an image sensing element constituted by a device such as a CCD or a CMOS which converts an optical image into an electrical signal. An A/D converter 23b converts an analog signal output from the image pickup unit 22b into a digital signal.

A VR image is picked up by the image pickup unit 22a and the image pickup unit 22b. A VR image is assumed to be an image of which VR display can be performed. VR images are assumed to include an omnidirectional image (a fully celestial image) captured by an omnidirectional camera (a fully celestial camera) and a panoramic image having a wider video range (a valid video range: a valid image range) than a display range that can be displayed at one time on display means. VR images include moving images and live view images (images acquired approximately in real time from a camera) in addition to still images. A VR image has a maximum video range (a valid video range) corresponding to a visual field of 360 degrees in an up-down direction (a vertical angle, an angle from a zenith, an elevation, a depression angle, or an elevation angle) and 360 degrees in a left-right direction (a horizontal angle or an azimuth). In addition, it is assumed that VR images include images with a wide angle of view (a visual field range) which is wider than an angle of view that can be photographed by an ordinary camera or images with a wider video range (a valid video range) than a display range that can be displayed at one time on display means even when the visual field of the images is smaller than 360 degrees in the up-down direction and smaller than 360 degrees in the left-right direction.

For example, an image photographed by a fully celestial camera capable of photographing a subject corresponding to a visual field (an angle of view) of 360 degrees in the left-right direction (a horizontal angle or an azimuth) and 210 vertical degrees centered on a zenith is a type of a VR image. In addition, for example, an image photographed by a camera capable of photographing a subject corresponding to a visual field (an angle of view) of 180 degrees or more in the left-right direction (a horizontal angle or an azimuth) and 180 vertical degrees centered on the horizontal direction is a type of a VR image. In other words, an image having a video range corresponding to a visual field of 160 degrees (±80 degrees) or more in both the up-down direction and the left-right direction and having a video range that is wider than a range that can be viewed at one time by a human being is a type of a VR image. By performing VR display (display in the "VR view" display mode) of the VR image, changing a posture of a display apparatus in a left-right rotation direction enables an omnidirectional video without any seams in the left-right direction (the horizontal rotation direction; the horizontal direction) to be viewed. In the up-down direction (a vertical rotation direction; a vertical direction), although an omnidirectional video without any seams can be viewed in a range of ±105 degrees with respect to directly above (the zenith), a range exceeding 105 degrees from directly above constitutes a blank region in which a video is not present. A VR image can be described as "an image of which a video range is at least a part of a virtual space (a VR space)".

VR display (a VR view) refers to a display method (a display mode) of displaying a video of a visual field range in accordance with a posture of the display apparatus among a VR image and in which a display range can be changed. When wearing and viewing a head mounted display (HMD) that is a display apparatus, a video of a visual field range in accordance with an orientation of the head of the user is to be displayed. For example, let us assume that a video with a viewing angle (an angle of view) centered on 0 degrees in the left-right direction (a specific orientation such as north) and 90 degrees in the up-down direction (90 degrees from the zenith or, in other words, horizontal) at a certain point in time among a VR image is being displayed. When front and back of the posture of the display means is reversed from this state (for example, when a direction that a display surface faces is changed from south to north), the display range is changed to a video with a viewing angle centered on 180 degrees in the left-right direction (an opposite orientation such as south) and 90 degrees in the up-down direction (horizontal) among the same VR image. This means that, in a case where the user is viewing the HMD, when the user turns his or her head from north to south (in other words, when the user turns around), the video displayed on the HMD also changes from a video of the north to a video of the south. Such a VR display enables the user to be provided with a sensation as though the user is visually present inside the VR image (inside the VR space). A smartphone mounted to VR goggles (a head mount adapter) can be considered a type of HMD. It should be noted that a display method of a VR image is not limited to the above and a configuration may be adopted in which a display range is moved (scrolled) in accordance with a user operation with respect to a touch panel, a directional button, or the like instead of a change in attitude. A configuration may be adopted in which, even when a VR image is displayed by VR display (displayed in the VR view mode), a display range can be changed in accordance with a touch-move operation with respect to the touch panel or a drag operation with respect to an operation member such as a mouse or the like in addition to changing the display range in accordance with a posture change.

An image processing unit 24 performs a prescribed resizing process or a prescribed color conversion process such as pixel interpolation or reduction with respect to data from the A/D converter 23a and the A/D converter 23b or data from a memory control unit 15. In addition, the image processing unit 24 performs a prescribed computing process using image data of a picked-up image. A system control unit 50 performs exposure control and ranging control on the basis of a computation result obtained by the image processing unit 24. Accordingly, an automatic focusing (AF) process, an automatic exposure (AE) process, and a preliminary light emission before flash (EF) process in a through-the-lens (TTL) system are performed. The image processing unit 24 further performs a prescribed computing process using image data of a picked-up image and performs an automatic white balance (AWB) process in the TTL system on the basis of an obtained computation result.

In addition, the image processing unit 24 performs basic image processing on two images (fisheye images) obtained from the A/D converter 23a and the A/D converter 23b and synthesizes (an image connecting process) the two images to generate a single VR image. In the image connecting process of the two images, for each of the two images, the image processing unit 24 calculates an amount of deviation between a reference image and a comparison image for each area by a pattern matching process and detects a connection position. Furthermore, in consideration of the detected connection position and each optical system lens characteristic, the image processing unit 24 respectively subjects the two images to distortion correction by geometric conversion and converts the images into a fully celestial image format. By blending the two images in the fully celestial image format, the image processing unit 24 finally generates a single fully celestial image (a VR image). The generated fully celestial image (the VR image) is an image using, for example, equidistant cylindrical projection, and a position of each pixel can be associated with coordinates on a surface of a sphere. Furthermore, the image processing unit 24 performs an image clipping process, an expanding process, distortion correction, or the like for realizing VR display of the VR image during VR display in a live view or during reproduction, and performs rendering in which the VR image is rendered on a VRAM of a memory 32.

Output data from an A/D converter 23 is written into the memory 32 via the image processing unit 24 and the memory control unit 15 or via the memory control unit 15. The memory 32 stores image data obtained by the image pickup unit 22 and converted into digital data by the A/D converter 23 and images to be output to an external display from the connecting I/F 25. The memory 32 has sufficient storage capacity for storing a prescribed number of still images and a prescribed time's worth of moving images and audio.

In addition, the memory 32 also doubles as a memory (a video memory) for image display. Data for image display stored in the memory 32 can be output to an external display from the connecting I/F 25. By sequentially transferring VR images picked up by the image pickup units 22a and 22b, generated by the image processing unit 24, and accumulated in the memory 32 to the external display and displaying the VR images on the external display, a function as an electronic view finder can be realized and live view display (LV display) can be performed. Hereinafter, an image displayed by a live view will be referred to as an "LV image". In addition, live view display (remote LV display) can also be performed by transferring VR images accumulated in the memory 32 to an external device (a smartphone or the like) wirelessly connected via a communication unit 54 and having the external device display the VR images.

A nonvolatile memory 56 is a memory as an electrically erasable and recordable recording medium and, for example, an EEPROM is used. Constants, a program, and the like for operations of the system control unit 50 are stored in the nonvolatile memory 56.

The system control unit 50 is a control unit constituted by at least one processor or one circuit and controls the entire digital camera 100. The system control unit 50 realizes the respective processes of the present embodiment (to be described later) by executing the program recorded in the nonvolatile memory 56 described earlier. For example, a RAM is used as a system memory 52. Constants and variables for the operations of the system control unit 50, the program read from the nonvolatile memory 56, and the like are deployed onto the system memory 52. In addition, the system control unit 50 also performs display control by controlling the memory 32. the image processing unit 24, the memory control unit 15, and the like.

A system timer 53 is a time-measuring unit for measuring time used in various controls and for measuring time according to an internal clock.

The mode changeover switch 60, the shutter button 61. and the operating unit 70 are operating means for inputting various operation instructions to the system control unit 50. The mode changeover switch 60 switches an operating mode of the system control unit 50 to any of a still image recording mode, a moving image photography mode, a reproduction mode, a communication connection mode, and the like. Modes included in the still image recording mode are an automatic photography mode, an automatic scene determination mode, a manual mode, an aperture priority mode (Av mode), a shutter speed priority mode (Tv mode), and a program AE mode. Other available modes include various scene modes that constitute photography settings for different photography scenes as well as custom modes. Using the mode changeover switch 60, the user can directly switch to any of these modes. Alternatively, after temporarily switching to a photography mode list screen using the mode changeover switch 60, another operating member may be used to select and switch to any of a plurality of modes being displayed on the display unit 28. In a similar manner, the moving image photography mode may also include a plurality of modes.

A first shutter switch 62 is switched on during an operation of the shutter button 61 provided on the digital camera 100 by a so-called half-press (a photography preparation instruction) and generates a first shutter switch signal SW1. In accordance with the first shutter switch signal SW1, photography preparation operations such as an automatic focusing (AF) process, an automatic exposure (AE) process, an automatic white balance (AWB) process, and a preliminary light emission before flash (EF) process are started.

A second shutter switch 64 is switched on upon completion of an operation of the shutter button 61 by a so-called full-press (a photography instruction) and generates a second shutter switch signal SW2. In accordance with the second shutter switch signal SW2, the system control unit 50 starts a series of operations of a photography process from reading a signal from the image pickup unit 22 to writing image data into a storage medium 300.

It should be noted that the shutter button 61 is not limited to an operation member capable of operations in the two stages of a full depression and a half depression and may be an operation member only capable of a one-stage depression. In this case, a photography preparation operation and a photography process are successively performed by a one-stage depression. This is a same operation as a case where a shutter button that can be fully depressed and half-depressed is so-called fully depressed (an operation in a case where SW1 and SW2 are generated approximately simultaneously).

By selecting and operating various function icons or options displayed on the display unit 28, each operating member of the operating unit 70 is appropriately assigned a function for each scene and acts as one of various function buttons. Examples of the function buttons include an end button, a return button, an image feed button, a jump button, a narrow-down button, and an attribute change button. For example, when a menu button is pushed, a menu screen enabling various settings to be performed is displayed on the display unit 28. The user can intuitively perform various settings by operating the operating unit 70 while looking at the menu screen displayed on the display unit 28.

A power supply control unit 80 is constituted by a battery detection circuit, a DC-DC converter, a switching circuit for switching between blocks to be energized, and the like, and detects whether or not a battery is mounted, a type of the battery, and a remaining battery level. In addition, the power supply control unit 80 controls the DC-DC converter on the basis of the detection results and an instruction from the system control unit 50 and supplies respective units including the storage medium 300 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the storage medium 300 that is a memory card, a hard disk, or the like. The storage medium 300 is a recording medium (a storage medium) such as a memory card for recording photographed images and is constituted by a semiconductor memory, an optical disk, a magnetic disk, or the like. The storage medium 300 may be a replaceable recording medium that is mountable to and dismountable from the digital camera 100 or a recording medium (a storage medium) that is built into the digital camera 100.

The communication unit 54 is connected wirelessly or by a wired cable and transmits and receives video signals, audio signals, and the like. The communication unit 54 is also capable of connecting to a wireless local area network (LAN) or the Internet. The communication unit 54 is capable of transmitting images (including LV images) picked up by the image pickup unit 22a and the image pickup unit 22b and images recorded on the storage medium 300 as well as receiving images and various other types of information from the external device.

An posture detecting unit 55 detects a posture of the digital camera 100 relative to a direction of gravitational force. Based on the posture detected by the posture detection portion 55, a determination can be made as to whether an image photographed by the image pickup unit 22 is an image photographed while holding the digital camera 100 horizontally or an image photographed while holding the digital camera 100 vertically. In addition, with respect to an image photographed by the image pickup unit 22, degrees of tilt in directions of the three axes of yaw, pitch, and roll of a posture at which the image had been photographed can be determined. The system control unit 50 can add orientation information in accordance with the posture detected by the posture detecting unit 55 to an image file of a VR image picked up by the image pickup units 22a and 22b and record the VR image after rotating the image (after adjusting an orientation of the VR image so as to perform tilt correction). As the posture detecting unit 55, a combination of one or more of an acceleration sensor, a gyro sensor, a geomagnetic sensor, an orientation sensor, an altitude sensor, and the like can be used. A motion (panning, tilting, uplifting, whether stationary or not, or the like) of the digital camera 100 can also be detected using the acceleration sensor, the gyro sensor, or the orientation sensor that constitutes the posture detecting unit 55.

A microphone 20 is a microphone for collecting sound around the digital camera 100 to be recorded as audio of a moving image of a VR image.

The connecting I/F 25 is a connecting plug to be connected to an HDMI (registered trademark) cable, a USB cable, or the like to be connected to an external device in order to transmit and receive video.

External View of Display Control Apparatus

Figure 3A:
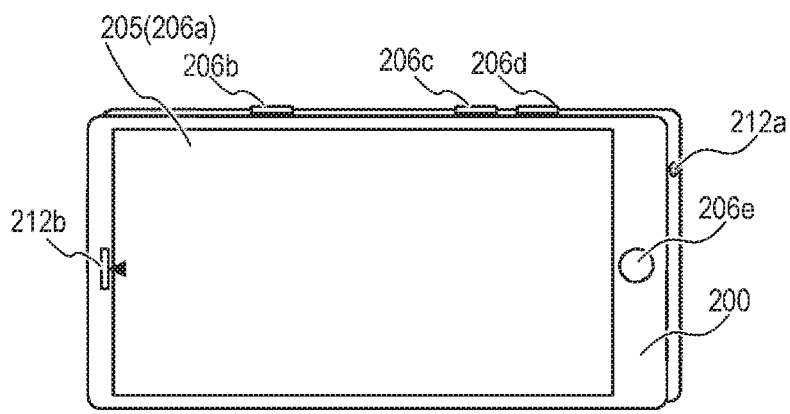
FIGS. 3A to 3C are diagrams illustrating a display control apparatus.

Next, a display control apparatus 200 which is an apparatus for reproducing a VR image will be described. FIG. 3A represents an example of an external view of the display control apparatus 200 which is a type of an electronic device. A display 205 is a display unit which displays images and various types of information. As described later, the display 205 is integrally constructed with a touch panel 206a and is configured to be capable of detecting a touch operation with respect to a display surface of the display 205. The display control apparatus 200 is capable of performing VR display of a VR image (a VR content) on the display 205. As illustrated, an operating unit 206 includes the touch panel 206a and operating units 206b, 206c, 206d, and 206e.

The operating unit 206b is a power supply button for accepting an operation to switch between turning a power supply of the display control apparatus 200 on and off. The operating unit 206c and the operating unit 206d are volume buttons for increasing and reducing a volume of audio output from an audio output unit 212. The operating unit 206e is a home button for causing a home screen to be displayed on the display 205. An audio output terminal 212a is an earphone jack that is a terminal for outputting audio to an earphone, an external speaker, or the like. A speaker 212b is a speaker built into a main body for producing audio.

Configuration of Display Control Apparatus

Figure 3B:
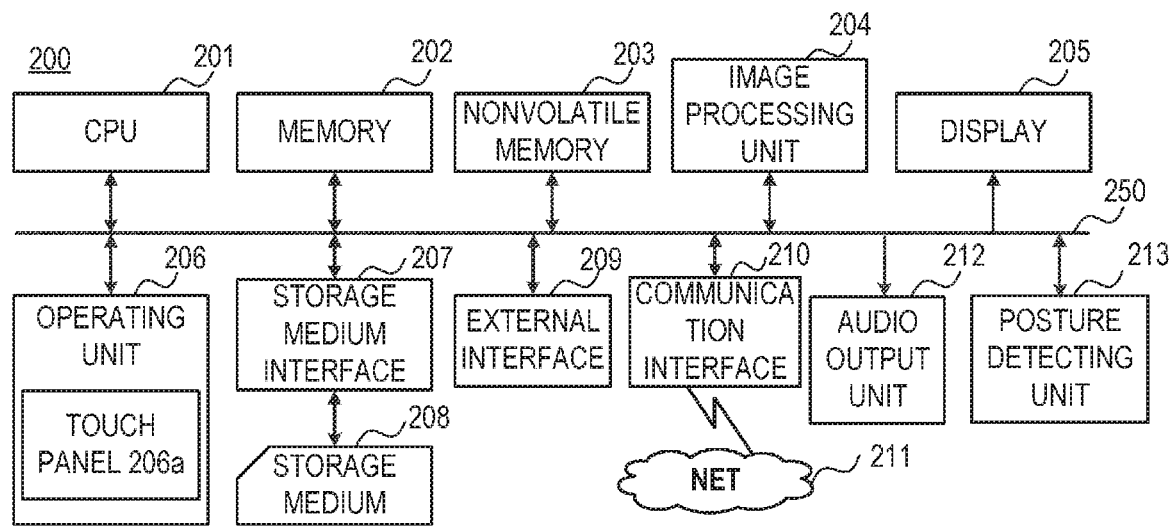

FIG. 3B shows an example of a configuration of the display control apparatus 200. The display control apparatus 200 can be configured using a display apparatus such as a smartphone. A CPU 201, a memory 202, a nonvolatile memory 203, an image processing unit 204, the display 205, the operating unit 206, a storage medium I/F 207, an external I/F 209, and a communication I/F 210 are connected to an internal bus 250. In addition, the audio output unit 212 and a posture detecting unit 213 are also connected to the internal bus 250. The respective units connected to the internal bus 250 are configured so as to be capable of exchanging data with one another via the internal bus 250.

The CPU 201 is a control unit which controls the entire display control apparatus 200 and is constituted by at least one processor or one circuit. In the present embodiment, since the CPU 201 controls display by the display 205 that is a display unit, the CPU 201 can be described as display controlling means. The memory 202 is constituted by, for example, a RAM (such as a volatile memory using a semiconductor element). The CPU 201 controls the respective units of the display control apparatus 200 by, for example, using the memory 202 as a work memory in accordance with a program stored in the nonvolatile memory 203. The nonvolatile memory 203 stores image data and audio data, other data. various programs that enable the CPU 201 to operate, and the like. The nonvolatile memory 203 is constituted by, for example, a flash memory or a ROM.

Under control by the CPU 201, the image processing unit 204 performs various types of image processing on images stored in the nonvolatile memory 203 or the storage medium 208, video signals acquired via the external I/F 209, images acquired via the communication I/F 210, and the like. Image processing performed by the image processing unit 204 includes an A/D conversion process and a D/A conversion process as well as an encoding process, a compression process, a decoding process, an enlargement/reduction process (resizing), a noise reduction process, a color conversion process, and the like of image data. The image processing unit 204 also performs various types of image processing such as panoramic development, a mapping process, and conversion of omnidirectional images or VR images being wide-range images having data of a wide range albeit not omnidirectional. The image processing unit 204 may be constituted by a dedicated circuit block for performing specific image processing. In addition, depending on a type of image processing, the CPU 201 may perform the image processing in accordance with a program without using the image processing unit 204.

The display 205 displays images, a graphical user interface (GUI) screen constituting a GUI, and the like under control by the CPU 201. The CPU 201 controls the respective units of the display control apparatus 200 so as to generate a display control signal in accordance with the program and to generate a video signal to be displayed on the display 205 and output the video signal to the display 205. The display 205 displays a video based on an output video signal. Alternatively, components of the display control apparatus 200 itself may be limited to up to an interface for outputting a video signal to be displayed by the display 205, and the display 205 may be constituted by an external monitor (such as a television).

The operating unit 206 is an input device for accepting a user operation of which examples include a character information input device such as a keyboard, a pointing device such as a mouse or a touch panel, a button, a dial, a joystick, a touch sensor, and a touch pad. In this case, the touch panel refers to an input device which is planarly configured so as to overlap with the display 205 and to output coordinate information in accordance with a touched position.

The storage medium I/F 207 is configured such that a storage medium 208 such as a memory card, a CD, or a DVD is mountable thereto and, under the control of the CPU 201, the storage medium I/F 207 reads data from and writes data to the mounted storage medium 208. The external I/F 209 is an interface to be connected to an external device using a wired cable or in a wireless manner to perform input and output of video signals and audio signals. The communication I/F 210 is an interface for communicating with an external device, the Internet 211, and the like to transmit and receive various types of data such as files and commands.

The audio output unit 212 outputs audio of moving images and music data, keyboard clicks, ring tones, various notification sounds, and the like. While it is assumed that the audio output unit 212 includes the audio output terminal 212*a* to which an earphone or the like is to be connected and the speaker 212*b*, alternatively, audio output may be performed by radio communication or the like.

The attitude detecting unit 213 detects a posture of the display control apparatus 200 relative to a direction of gravitational force or a tilt of the posture of the display control apparatus 200 relative to the respective axes of yaw, pitch, and roll. On the basis of a posture detected by the posture detecting unit 213, a determination can be made as to whether the display control apparatus 200 is being held horizontally, held vertically, pointed upward, pointed downward, or assuming an oblique attitude. As the posture detecting unit 213, at least one of an acceleration sensor, a gyro sensor, a geomagnetic sensor, an orientation sensor, an altitude sensor, and the like can be used or a plurality of the sensors can be used in combination.

The operating unit 206 includes the touch panel 206*a*. The CPU 201 is capable of detecting the following operations with respect to the touch panel 206*a* or the following states of the touch panel 206*a*.

A state where a finger or a stylus previously not in touch with the touch panel 206*a* newly touches the touch panel 206*a* or, in other words, a start of a touch (hereinafter referred to as a touch-down)

A state where the touch panel 206*a* is being touched by a finger or a stylus (hereinafter referred to as a touch-on)

A state where a finger or a stylus is moving while in touch with the touch panel 206*a* (hereinafter referred to as a touch-move)

A state where a finger or a stylus previously in touch with the touch panel 206*a* separates from the touch panel 206*a* or, in other words, an end of a touch (hereinafter referred to as a touch-up)

A state where nothing is touching the touch panel 206*a* (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The CPU 201 is notified of the operations or the states described above as well as position coordinates where a finger or a stylus is touching the touch panel 206*a* through an internal bus and, on the basis of the notified information, the CPU 201 determines what kind of operation (touch operation) has been performed on the touch panel 206*a*. With respect to a touch-move, a movement direction of a finger or a stylus moving on the touch panel 206*a* can be determined for each of a vertical component and a horizontal component on the touch panel 206*a* on the basis of a change in the position coordinates. It is assumed that a determination that a slide operation has been performed is made when a touch-move of a prescribed distance or more is detected. An operation involving quickly moving a finger on the touch panel 206*a* for a certain distance while keeping the finger in touch with the touch panel 206*a* and then releasing the finger is referred to as a flick. In other words, a flick is an operation in which a finger quickly traces the touch panel 206*a* as though flicking on the touch panel 206*a*. A determination that a flick has been performed can be made (a determination that a flick has occurred following a slide operation can be made) when a detection of a touch-move of a prescribed distance or more at a prescribed speed or more is followed by a detection of a touch-up. Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch).

As the touch panel 206*a*, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

VR Goggles

Figure 3C:
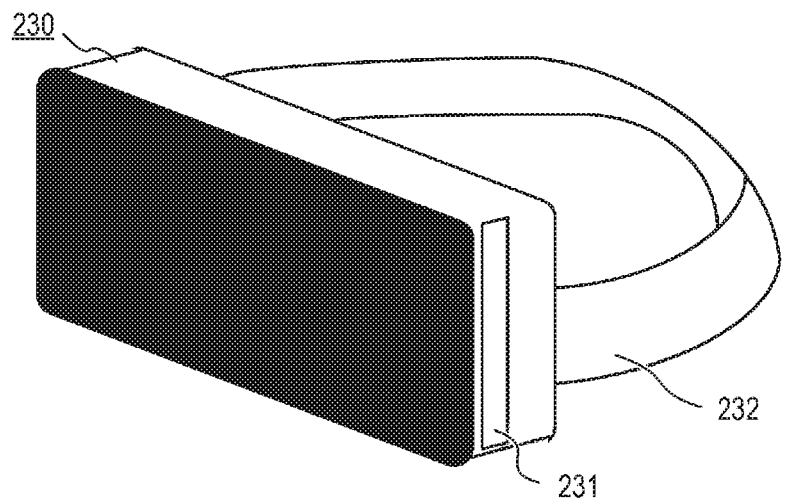

FIG. 3C is an external view of VR goggles (a head mount adapter) 230 to which the display control apparatus 200 is mountable. By mounting the display control apparatus 200 to VR goggles 230, the display control apparatus 200 can also be used as a head mounted display.

An insertion opening 231 is an insertion opening to which the display control apparatus 200 is to be inserted. The entire display control apparatus 200 can be inserted into the VR goggles 230 by orienting the display surface of the display 205 toward a side of a headband 232 for fixing the VR goggles 230 to the head of the user (in other words, toward the user). By wearing the VR goggles 230 to which the display control apparatus 200 has been mounted in this manner, the user can view the display 205 in a state where the VR goggles 230 are worn on the user's head without having to manually hold the display control apparatus 200.

In this case, when the user moves his or her head or entire body, a posture of the display control apparatus 200 also changes. The attitude detecting unit 213 detects a change in the posture of the display control apparatus 200 at this point, and the CPU 201 performs a VR display process on the basis of the change in the posture. In this case, the detection of the posture of the display control apparatus 200 by the posture detecting unit 213 is equivalent to a detection of a posture of the head of the user (a direction in which a line of sight of the user is oriented).

Image Reproduction Process

Figure 4:
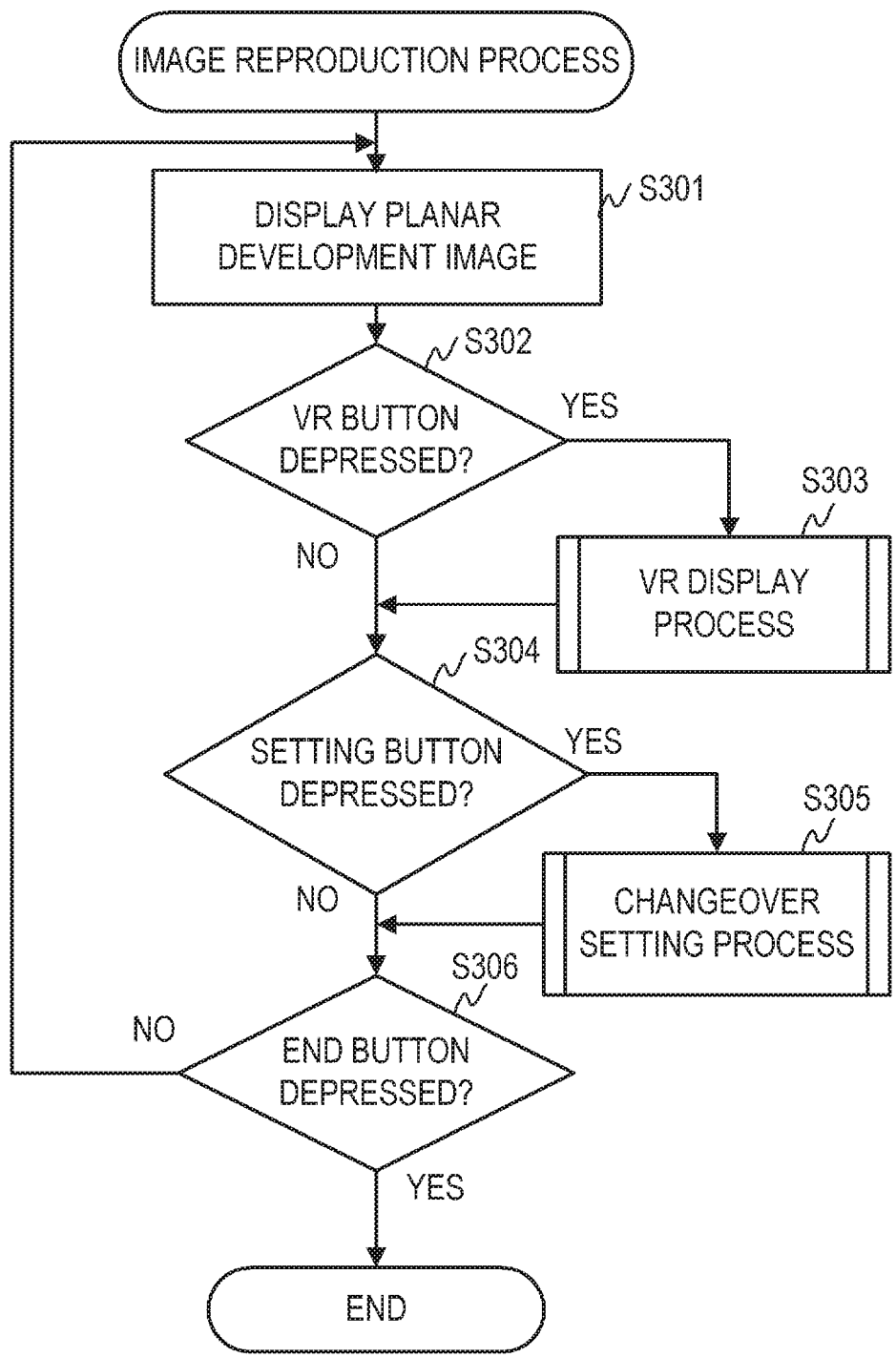
FIG. 4 is a flow chart showing an image reproduction process.

Next, an image reproduction process according to the present embodiment will be described using the flow chart in FIG. 4. The process of the present flow chart is started when the operating unit 206*b* that is a power supply button is operated and the power supply is switched on to cause the CPU 201 to initialize a flag, a control variable, or the like.

Figure 5B:
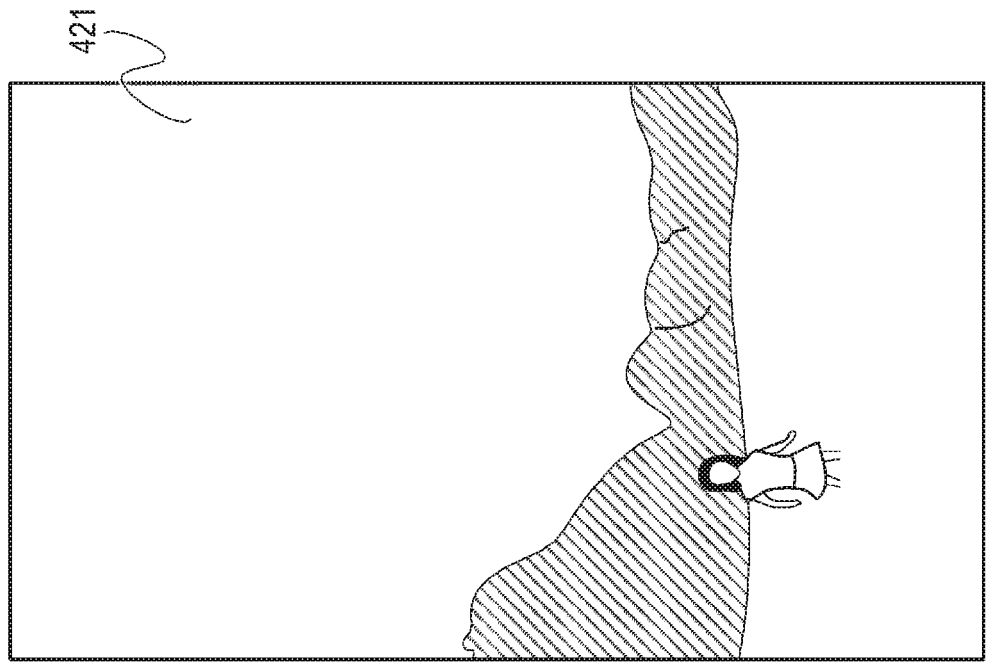
FIG. 5B is a diagram showing a VR display state.
Figure 5A:
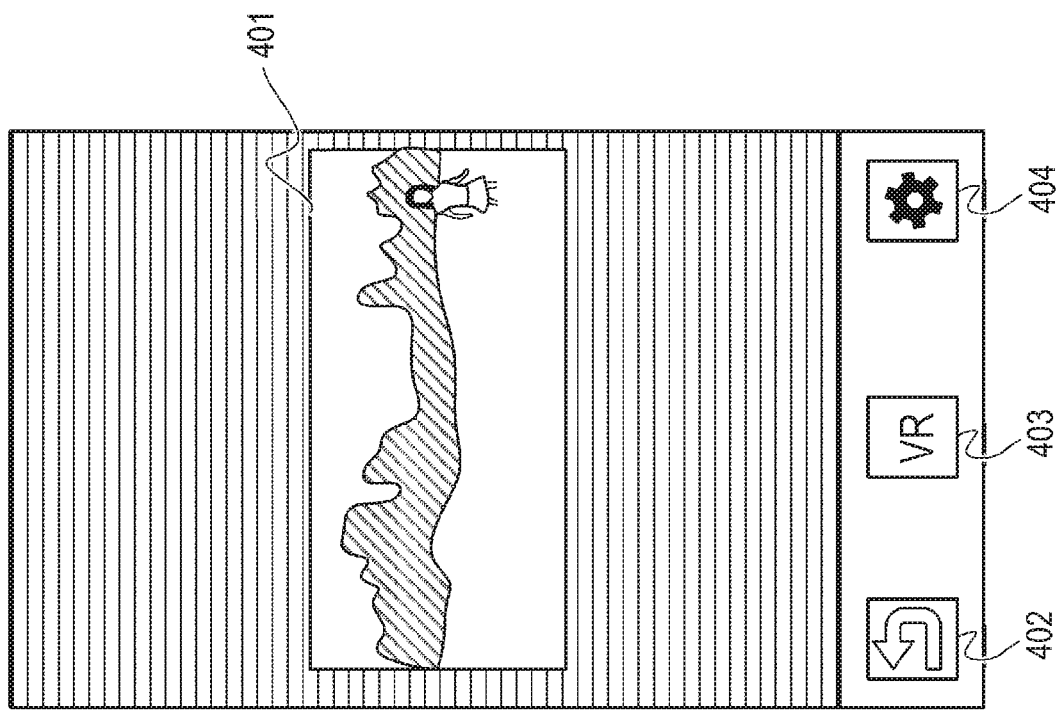
FIG. 5A is a diagram showing an ordinary display state.

In S301, the CPU 201 acquires image data and operation button information stored in the storage medium 208 and, as shown in FIG. 5A, displays a planar development image 401 of a VR image on the display 205. In this case, the planar development image refers to an image obtained by correcting a part of the VR image so that a horizontal line (a horizon) assumes a linear shape. In addition, the planar development image 401 is an image that displays a wider range of the VR image than when subjecting the VR image to VR display. Therefore, due to the planar development image 401, the user can acquire a general idea of the VR image. Hereinafter, a display state in which the planar development image 401 is being displayed in this manner will be referred to as an "ordinary display state". In the present embodiment, an end button 402, a VR button 403, and a setting button 404 are displayed on the display 205 together with the planar development image 401.

In S302, the CPU 201 determines whether or not a touch operation of the VR button 403 has been performed with respect to the operating unit 206 (the touch panel 206a). When the operation has been performed, a transition is made to S303, but otherwise a transition is made to S304.

In S303, the CPU 201 performs a VR display process (to be described later) including changing the display state to a "VR display state". FIG. 5B shows an example of the "VR display state". The "VR display state" is a state where a display region 421 that is a part of the VR image is displayed and a display range of the VR image can be changed in accordance with a posture detection of the display control apparatus 200 or a user operation.

In S304, the CPU 201 determines whether or not a touch operation of the setting button 404 has been performed with respect to the operating unit 206 (the touch panel 206a). When the operation has been performed, a transition is made to S305, but when the operation has not been performed, a transition is made to S306.

In S305, the CPU 201 performs a changeover setting process of a VR image to be described later. In this case, the changeover setting process refers to a process of setting whether or not the VR image to be displayed is to be changed over (changed) to another VR image by a user operation in the "VR display state".

In S306, the CPU 201 determines whether or not a touch operation of the end button 402 has been performed with respect to the operating unit 206 (the touch panel 206a). When the operation has been performed, the image reproduction process is ended, but then the operation has not been performed, a transition is made to S301.

VR Display Process: S303

Figure 6:
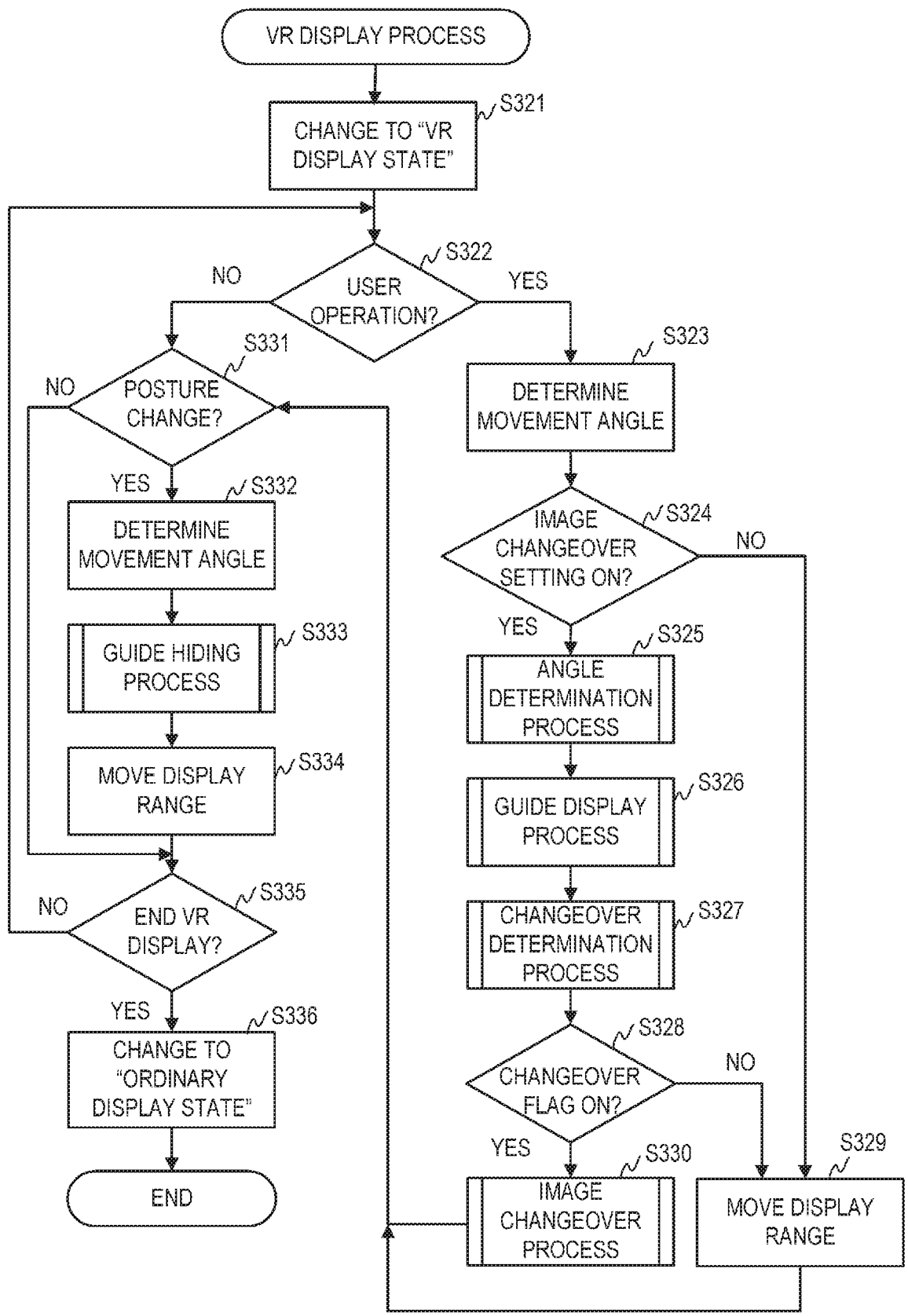
FIG. 6 is a flow chart showing a VR display process.

Hereinafter, the VR display process that is executed in S303 will be described in detail with reference to the flow chart shown in FIG. 6.

In S321, the CPU 201 changes the VR image so as to be subjected to VR display and changes the display state of the display 205 to the "VR display state" as shown in FIG. 5B.

In S322, the CPU 201 determines whether or not a prescribed user operation for changing the display range of the VR image has been performed. When the operation has been performed, a transition is made to S323, but otherwise a transition is made to S331. The prescribed user operation for changing the display range of the VR image according to the present embodiment is, for example, a slide operation with respect to the operating unit 206 (the touch panel 206a). In order to change the display range of the VR image, a direction (a display direction) in which a display range is present in a VR space must be changed. Therefore, the prescribed user operation can be described an operation for changing the display direction.

In S323, the CPU 201 determines (updates) a movement angle ANG in accordance with the user operation for changing the display range of the VR image. More specifically, in the present embodiment, the movement angle ANG is determined on the basis of an operation amount or an operation direction of the slide operation with respect to the operating unit 206. In addition, the CPU 201 stores the determined movement angle ANG in the memory 202.

The movement angle ANG refers to an angle formed between the direction (the display direction) in which a display range is present in the VR space and a reference direction. More specifically, the movement angle ANG refers to a change in angle from the reference direction when determining the display direction. In other words, it can be said that the display range of the VR image is determined by the movement angle ANG from the reference direction. It should be noted that the reference direction is a direction of an origin stored so as to correspond to the VR image, a direction at a time point of start of display of the VR image, or the like and can be arbitrarily determined. For example, the reference direction is a direction that does not change in accordance with the user operation described above or a posture of the display control apparatus 200 and, in other words, the reference direction is a direction that does not change in accordance with the display direction. In addition, the movement angle ANG is constituted by a component (a left-right component) in the left-right direction (a horizontal direction; an azimuth) and a component (an up-down component) in the up-down direction (a vertical direction; an elevation).

For example, when the display direction is determined by moving rightward by 90 degrees from the reference direction, it can be determined that the component (the left-right component) in the left-right direction of the movement angle ANG is 90 degrees. On the other hand, when the display direction is determined by moving leftward by 270 degrees from the reference direction, it can be described that the left-right component of the movement angle ANG is −270 degrees. Moreover, for example, a further rightward movement by 90 degrees after one rightward rotation (a movement by 360 degrees) can be considered a rightward movement by 450 degrees. Therefore, in this case, the left-right component of the movement angle ANG is 450 degrees.

In this manner, in the present embodiment, when the display direction moves rightward from the reference direction, the left-right component of the movement angle ANG increases from 0. When the display direction moves leftward from the reference direction, the left-right component of the movement angle ANG decreases from 0. In a similar manner, when the display direction moves upward from the reference direction, the component (up-down component) in the up-down direction of the movement angle ANG increases from 0. When the display direction moves downward from the reference direction, the up-down component of the movement angle ANG decreases from 0. Therefore, for example, when the left-right component of the movement angle ANG >0, the display direction is determined by a rightward movement of an angle from the reference direction. In this manner, in the present embodiment, while the left-right component of the movement angle ANG takes a positive number when moving rightward and takes a negative number when moving leftward, positive and negative may be reversed. Alternatively, the left-right component may take a positive number regardless of the direction of movement being leftward or rightward. The same applies to the up-down direction.

Figure 7:
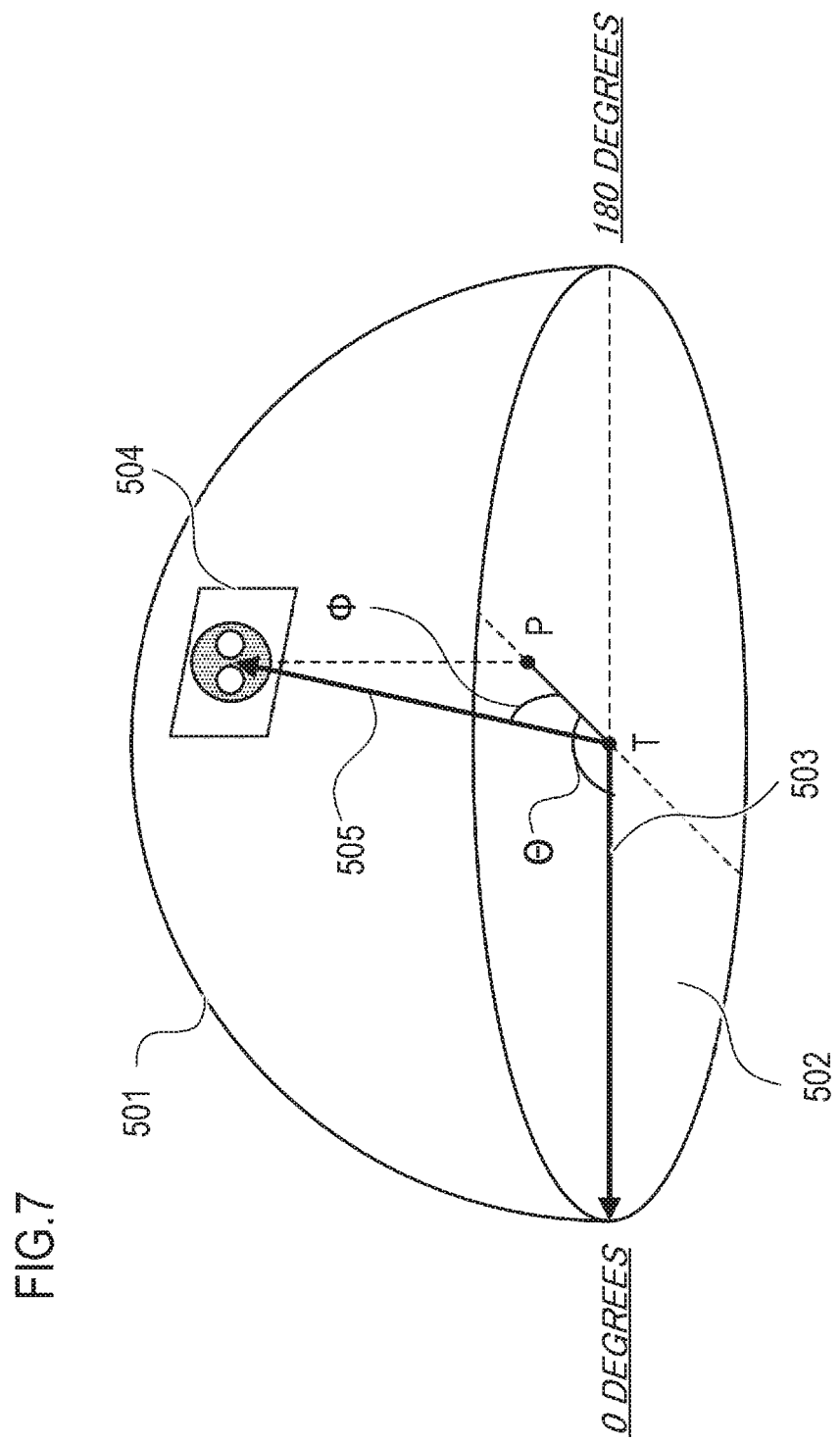
FIG. 7 is a diagram illustrating a movement angle.

The left-right component and the up-down component of the movement angle ANG will now be described in detail with reference to FIG. 7. FIG. 7 is a diagram expressing a VR space 501 of a VR image. A point T represents a center point (a center position) of the VR space. A point P represents a point where a perpendicular to a horizontal plane 502 (a reference plane) from a center of a display range 504 displayed on the display 205 and the horizontal plane 502 intersect with each other. While the VR space 501 is shown in FIG. 7 in a hemispherical shape for the sake of brevity, the VR space 501 is actually fully rounded.

Let us assume that, in the example shown in FIG. 7, the direction in which the display range is present has moved from a reference direction 503 toward a display direction 505 being a direction from the point T toward the center of the display range 504 in accordance with a user operation for a rightward and upward movement. In this case, the left-right component of the movement angle ANG is an angle θ formed between the reference direction 503 and a direction from the point T toward the point P. On the other hand, the up-down component of the movement angle ANG is an angle Φ formed between the display direction 505 and a direction from the point T toward the point P.

In S324, the CPU 201 determines whether or not an image changeover setting stored in the memory 202 is ON. In this case, the image changeover setting is a setting indicating whether or not the VR image to be displayed is to be changed over to another VR image when a user operation for changing the display range satisfies a prescribed condition. When the image changeover setting is ON, a transition is made to S325, but otherwise a transition is made to S329.

S325: Angle Determination Process

In S325, the CPU 201 performs an angle determination process. In this case, the angle determination process is a process of determining a condition for performing a changeover (a change) of the VR image to be displayed to another VR image.

Figure 8B:
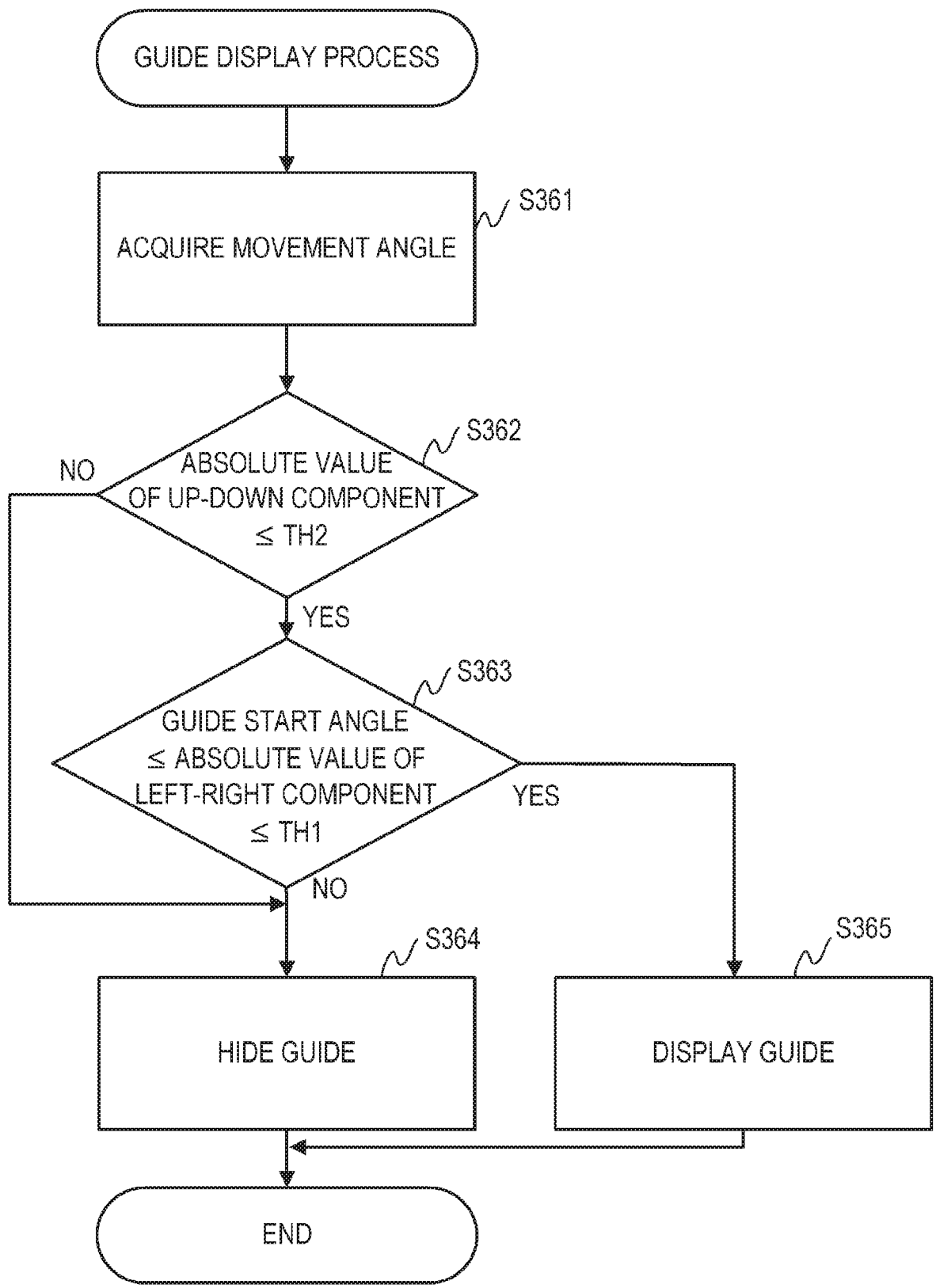
FIG. 8B is a flow chart showing a guide display process.

Hereinafter, the angle determination process that is executed in S325 will be described in detail with reference to the flow chart shown in FIG. 8A.

In S351, the CPU 201 determines whether or not a prescribed angle TH1 has already been set. In the present embodiment, the prescribed angle TH1 is a threshold for determining whether or not a process of changing over the VR image to be displayed to another VR image is to be performed when the movement angle ANG changes in the left-right direction in accordance with a user operation. When the prescribed angle TH1 has not been set, a transition is made to S352, but when the prescribed angle TH1 has been set, the angle determination process shown in the present flow chart is ended.

In S352, the CPU 201 acquires image type information of the VR image being displayed. For example, the image type information is information indicating a video range (a valid image range; a valid video range) of a VR space in the VR image.

In S353, on the basis of the image type information acquired in S352, the CPU 201 determines whether or not the VR image being displayed is a 360-degree image. A 360-degree image refers to a VR image having a video range (a valid image range; a valid video range) corresponding to a visual field of 360 degrees in the up-down direction (the vertical direction) and 360 degrees in the left-right direction (the horizontal direction). When the VR image being displayed is a 360-degree image, a transition is made to S355, but otherwise a transition is made to S354.

In S354, the CPU 201 sets the prescribed angle TH1 in accordance with an image type and stores the prescribed angle TH1 in the memory 202. Specifically, for example, the wider (larger) the displayable range (the valid image range) in the left-right direction of the VR image, the larger the value of the prescribed angle TH1 determined by the CPU 201. Once the process of S354 ends, the angle determination process shown by the present flow chart ends.

In S355, the CPU 201 sets the prescribed angle TH1 to 360 degrees or a value (slightly larger than 360 degrees) that is larger than 360 degrees and stores the prescribed angle TH1 in the memory 202. Once the process of S355 ends, the angle determination process shown by the present flow chart ends.

It should be noted that the prescribed angle TH1 need not necessarily be determined in accordance with a flow such as that described above and, for example, the prescribed angle TH1 may be determined in advance by user input.

S326: Guide Display Process

In S326, the CPU 201 performs a guide display process. In this case, the guide display process refers to a process of displaying, when a condition is satisfied, a guide that is a display for supporting (assisting) a changeover of the VR image to be displayed to another VR image. Hereinafter, the guide display process that is executed in S326 will be described in detail with reference to the flow chart shown in FIG. 8B.

In S361, the CPU 201 acquires the movement angle ANG from the memory 202.

In S362, the CPU 201 determines whether or not a condition requiring that an absolute value of the component in the up-down direction (the vertical direction) of the movement angle ANG be within a prescribed angle TH2 set in advance is satisfied. When the condition is satisfied, a transition is made to S363, but otherwise a transition is made to S364. It should be noted that the prescribed angle TH2 may have a same value as the prescribed angle TH1 or may have a different value.

In S363, the CPU 201 determines whether or not a condition requiring that an absolute value of the component in the left-right direction (the horizontal direction) of the movement angle ANG be within the prescribed angle TH1 and equal to or larger than an angle (a guide start angle) set in advance for starting guide display is satisfied. When the condition (a guide display condition) is satisfied, a transition is made to S365, but otherwise a transition is made to S364.

In S364, the CPU 201 hides a guide 462 and a guide 463 of the display 205 to be described later. Once the process of S364 ends, the guide display process shown by the present flow chart ends.

In S365, the CPU 201 displays the guide 462 and the guide 463 in accordance with the movement angle ANG on the display 205 as shown in FIG. 9B. Once the process of S365 ends, the guide display process shown by the present flow chart ends.

It should be noted that display of the guide 462 and the guide 463 is not limited to the process described above and the guide 462 and the guide 463 may be always displayed or always hidden. In addition, when the process of S361 ends without performing the determination of S362, a transition may be made to S363.

Figure 10B:
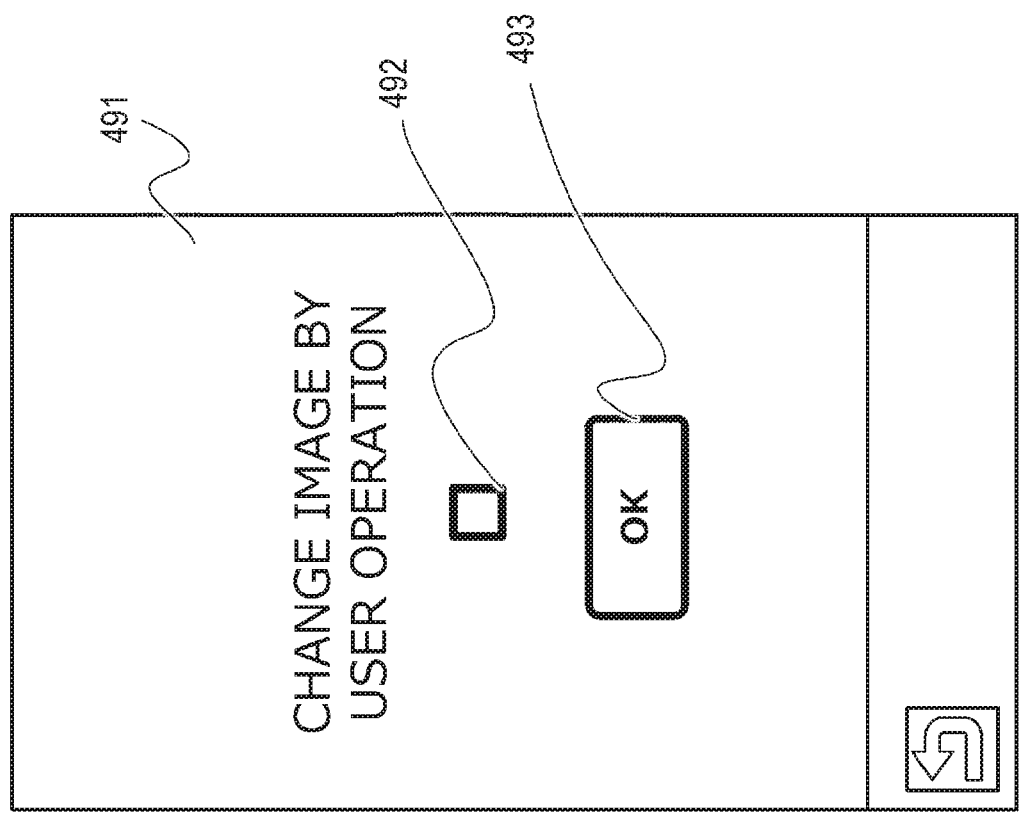
FIG. 10B is a diagram illustrating a setting display state.
Figure 10A:
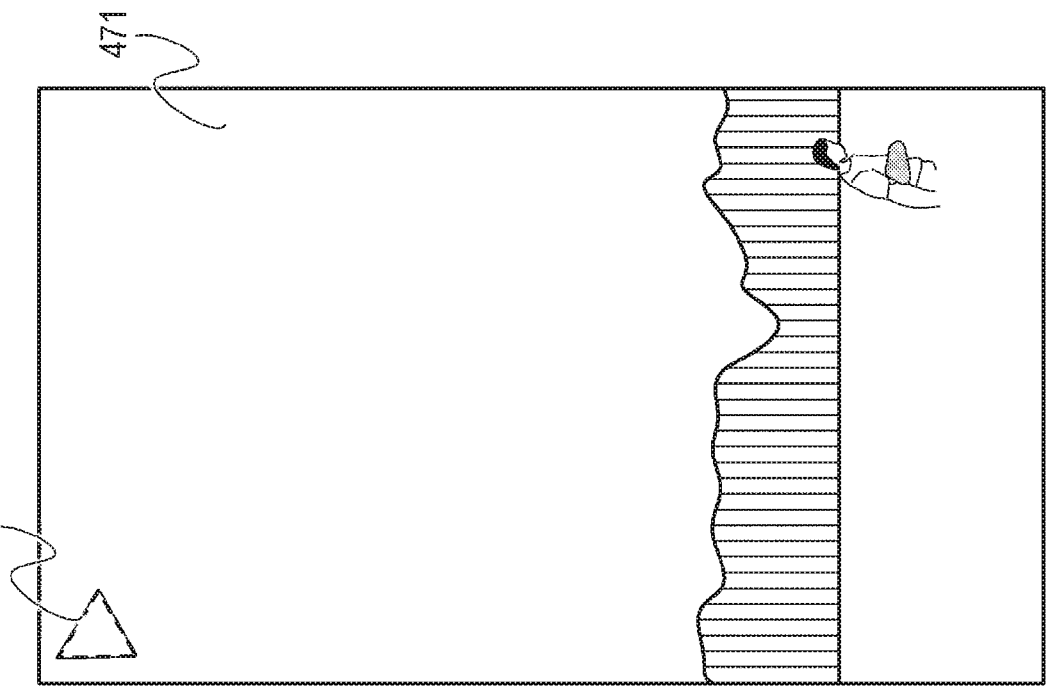
FIG. 10A is a diagram illustrating a guide display.

FIGS. 9A, 9B, and 10A are diagrams illustrating a guide display example. FIG. 9A shows that, in a state where VR display of the display region 421 is being performed, a slide operation is being performed by the user in a direction indicated by an arrow 452 with respect to the operating unit 206. It should be noted that the arrow 452 is not actually displayed on the display 205 but is merely shown for the purpose of illustration in the present embodiment.

FIG. 9B shows a display state in a case where the display range of the VR image has been moved from the state shown in FIG. 9A by a slide operation and the guide display condition determined in S363 is satisfied. In this case, a display region 461 of the VR image is displayed and the guide 462 and the guide 463 are displayed. In the present embodiment, the guide 462 and the guide 463 indicate an operation amount and an operation direction of a user operation which are necessary to change over the VR image to be displayed to another VR image. More specifically, in the present embodiment, when the user performs a slide operation by a distance corresponding to the two guides with respect to the operating unit 206 in a direction from the guide 463 toward the guide 462, the condition for changing over the VR image to another VR image is satisfied as shown in FIG. 10A.

Figure 11A:
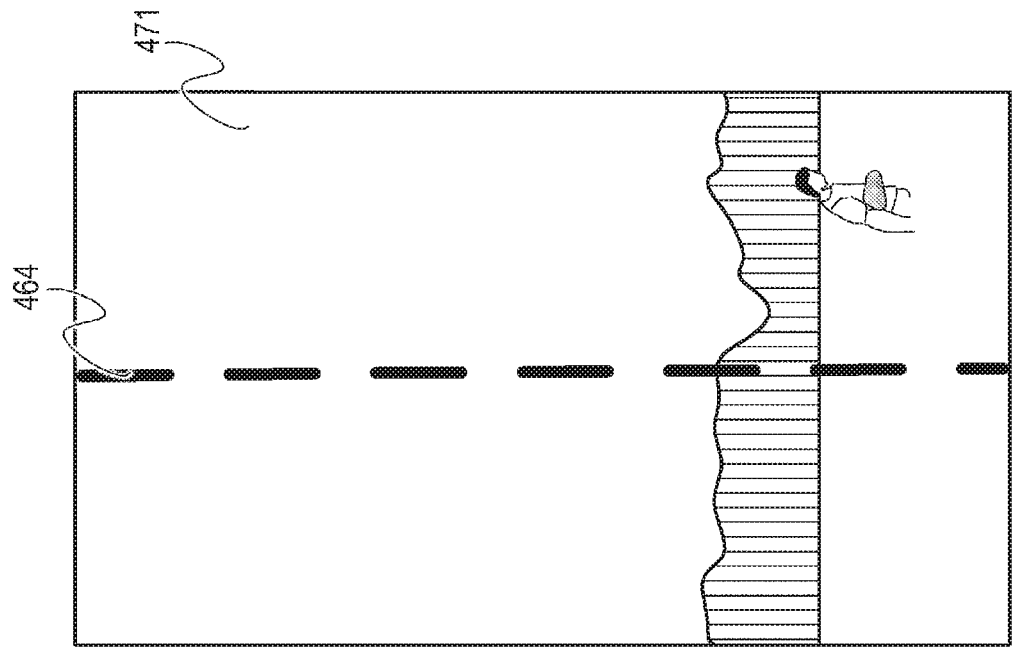
FIGS. 11A and 11B are diagrams illustrating another guide display.
Figure 11B:
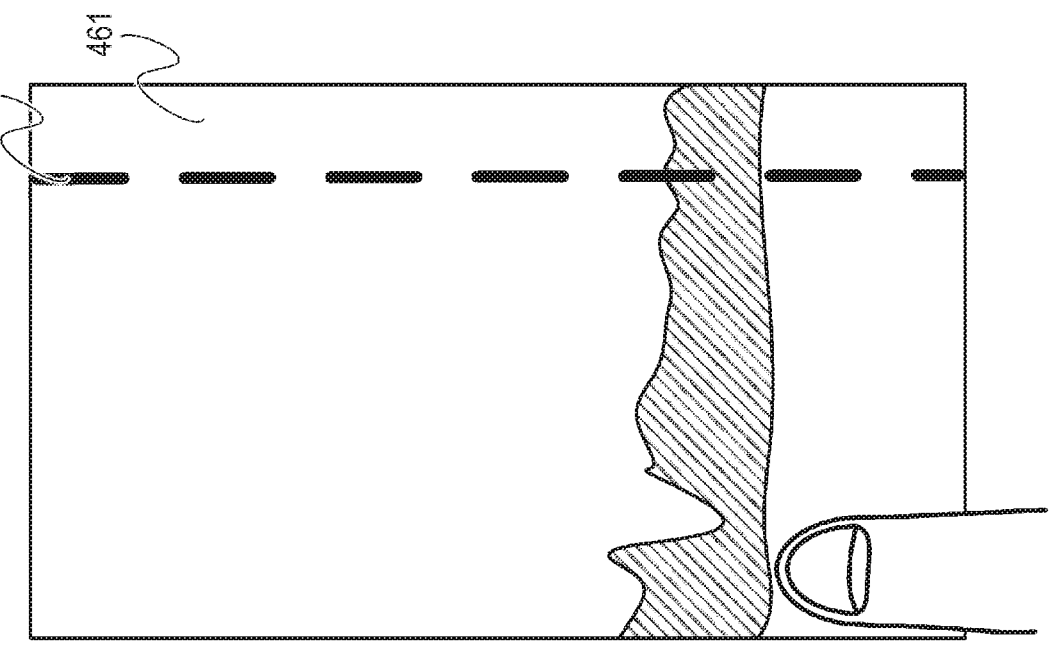

The guide to be displayed is not limited to 462 and 463 shown in FIG. 9B and may be a guide 464 with a dashed line shape (linear shape) as shown in FIG. 11A. In this case, by performing a user operation (a slide operation) so that the guide 464 is positioned at a center position of a display region 471 as shown in FIG. 11B, the user can comprehend that the VR image to be displayed can be changed over to another VR image. In addition, by performing such a user operation, a condition for performing a changeover of the VR image to another VR image to be described later in S373 is satisfied.

S327: Changeover Determination Process

Figure 12A:
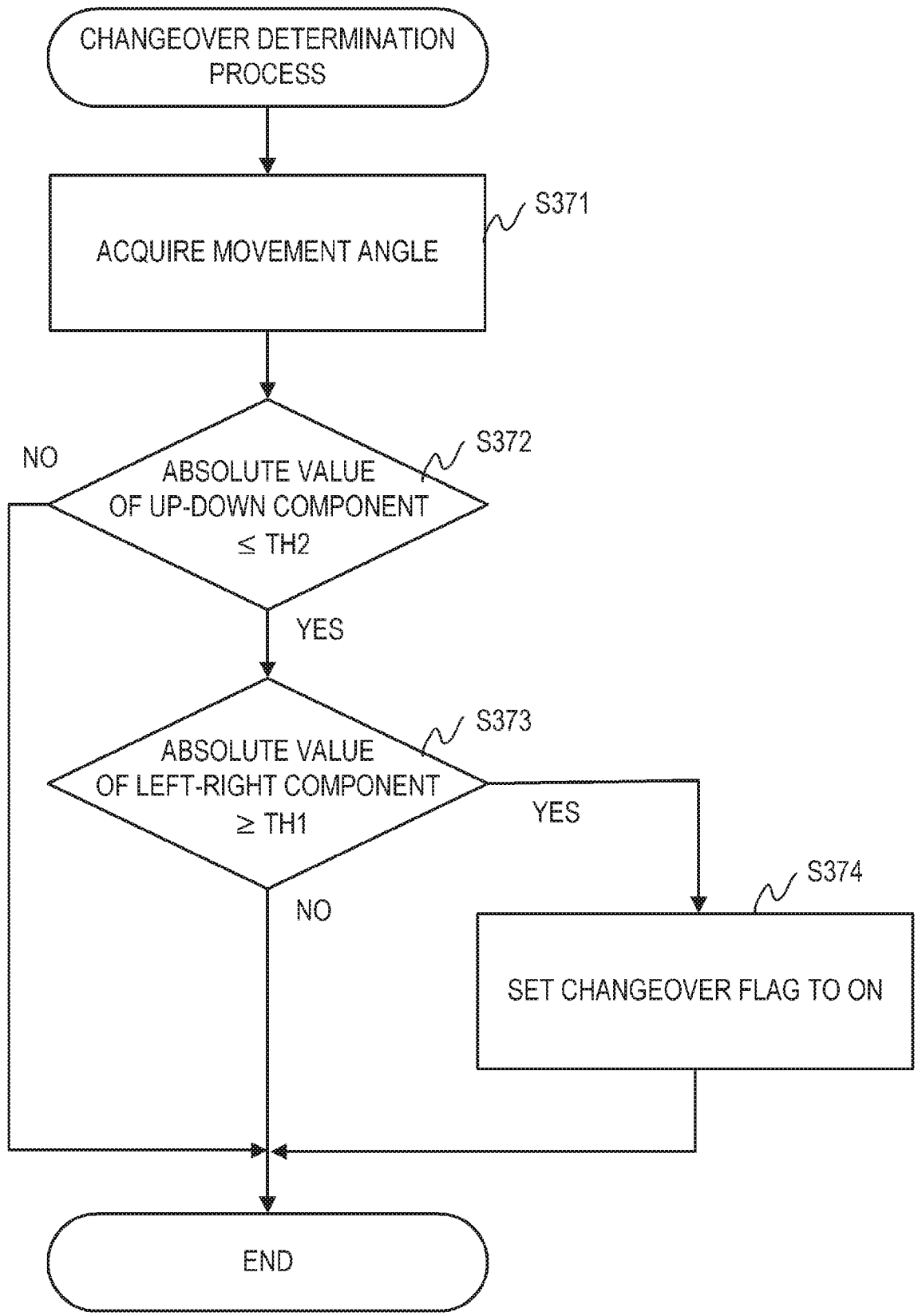
FIG. 12A is a flow chart showing a changeover determination process.

In S327, the CPU 201 performs a changeover determination process. More specifically, the CPU 201 sets a changeover flag that indicates whether or not the VR image to be displayed is to be changed over to another VR image. Hereinafter, the changeover determination process that is executed in S327 will be described in detail with reference to the flow chart shown in FIG. 12A.

In S371, the CPU 201 acquires the movement angle ANG from the memory 202.

In S372, the CPU 201 determines whether or not a condition requiring that a movement in the up-down direction of the display range of the VR image be within the prescribed angle TH2 is satisfied. In other words, the CPU 201 determines whether or not an absolute value of the component in the up-down direction (the up-down component) of the movement angle ANG is within the prescribed angle TH2. When the condition is satisfied, a transition is made to S373, but otherwise the changeover determination process shown by the present flow chart is ended.

In S373, the CPU 201 determines whether or not a condition requiring that a movement in the left-right direction of the display range of the VR image be equal to or larger than the prescribed angle TH1 is satisfied. In other words, the CPU 201 determines whether or not an absolute value of the component in the left-right direction (the left-right component) of the movement angle ANG is equal to or larger than the prescribed angle TH1. When the condition is satisfied, a transition is made to S374, but otherwise the changeover determination process shown by the present flow chart is ended.

FIG. 10A shows a state where the display range of the VR image shown in FIG. 9B has been further moved to the right, the display region 471 is displayed, and the guide 463 has moved to the left together with the display range and has overlapped with the guide 462. In other words, FIG. 10A shows a display example in a case where the absolute value of the left-right component of the movement angle ANG is determined in S373 to be equal to or larger than the prescribed angle TH1.

In S374, the CPU 201 sets the image changeover flag to ON. Once the process of S374 ends, the changeover determination process shown by the present flow chart ends.

In the present embodiment, the CPU 201 sets the changeover flag to ON only when the absolute value of the up-down component of the movement angle ANG is equal to or smaller than the prescribed angle TH2 and the absolute value of the left-right component of the movement angle ANG is equal to or larger than the prescribed angle TH1. Accordingly, since conditions under which the changeover flag is set to ON are limited, the possibility that the VR image to be displayed is changed over to another VR image by a misoperation by the user can be reduced.

In cases where the processes are to be streamlined or the like, the process of S372 need not necessarily be performed. In other words, once the process of S371 ends, a transition may be made to S373.

In S328, the CPU 201 determines whether or not the image changeover flag is set to ON. When the image changeover flag is set to ON, a transition is made to S330, but otherwise a transition is made to S329.

In S329, the CPU 201 determines the display direction in accordance with the movement angle ANG determined (updated) in S323 and changes the display range of the VR image on the display 205.

S330: Image Changeover Process

Figure 12B:
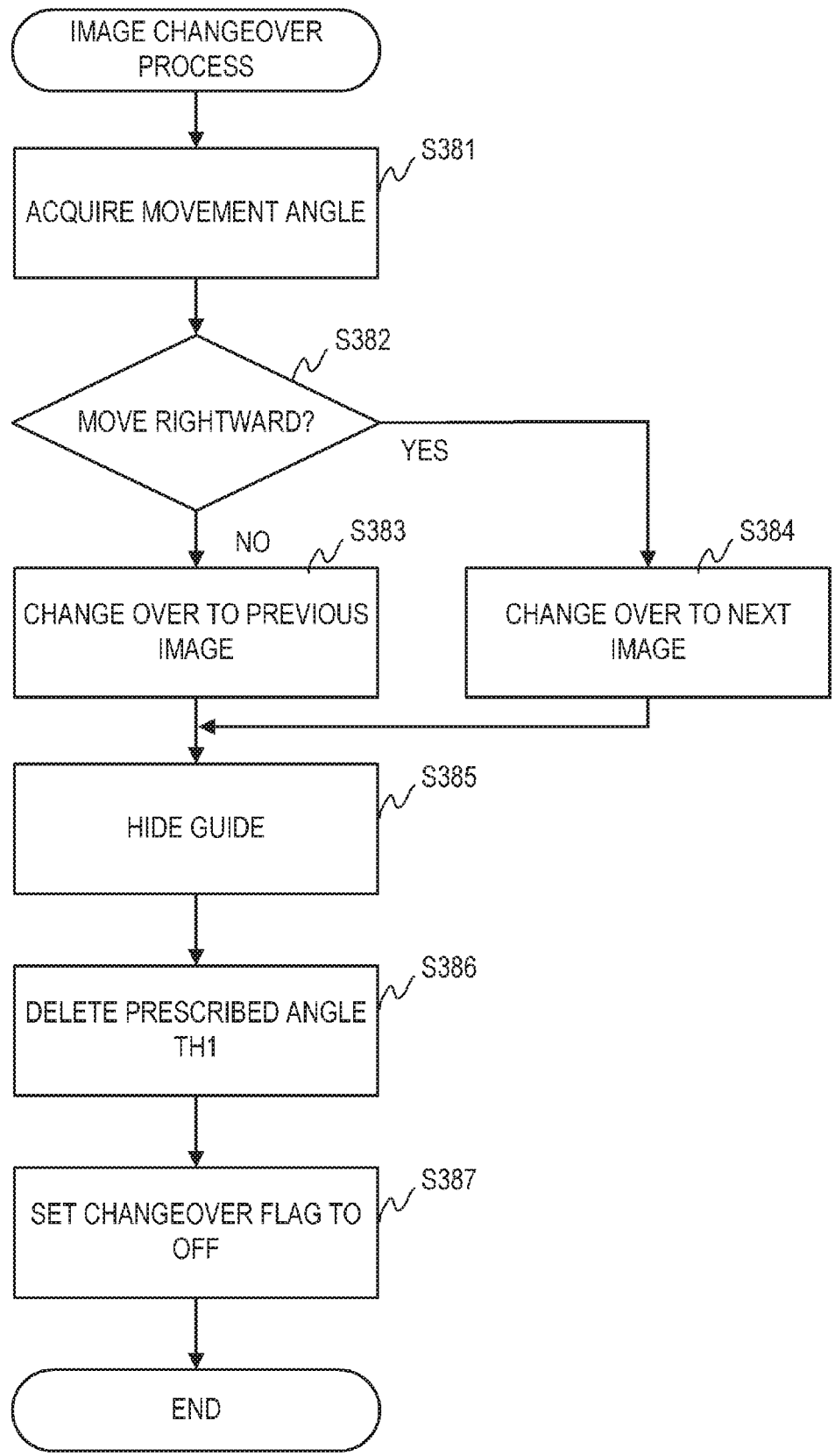
FIG. 12B is a flow chart showing an image changeover process.

In S330, the CPU 201 performs an image changeover process that is a process of changing over the VR image to be displayed to another VR image. Hereinafter, the image changeover process that is executed in S330 will be described in detail with reference to the flow chart shown in FIG. 12B.

In S381, the CPU 201 acquires the movement angle ANG from the memory 202.

In S382, the CPU 201 determines whether or not the display range of the VR image has moved rightward by the prescribed angle TH1 or more. In other words, the CPU 201 determines whether or not a rightward component of the movement angle ANG is equal to or larger than the prescribed angle TH1. It should be noted that the determination need not be made on the basis of whether the rightward component (the rightward component value) of the movement angle ANG is equal to or larger than the prescribed angle TH1 and may be made on the basis of whether the rightward component (the rightward component value) is either positive or negative. When the component is equal to or larger than the prescribed angle TH1, a transition is made to S384, but otherwise a transition is made to S383.

In S383, the CPU 201 changes over the VR image being displayed on the display 205 to a previous VR image that is stored in the storage medium 208.

In S384, the CPU 201 changes over the VR image being displayed on the display 205 to a next VR image that is stored in the storage medium 208. In other words, in the present embodiment, when changing over the image to be displayed to another image, the CPU 201 differentiates an image to be changed over to another image depending on whether the component in the left-right direction (the horizontal direction) of the movement angle ANG is positive or negative.

In S385, the CPU 201 hides the guides 462 and 463 of the display 205.

In S386, the CPU 201 deletes the setting of the prescribed angle TH1 stored in the memory 202 (changes the prescribed angle TH1 to unset).

In S387, the CPU 201 sets the image changeover flag to OFF. Once the process of S387 ends, the image changeover process shown by the present flow chart ends.

In S331, the CPU 201 detects a posture of the display control apparatus 200 using the posture detecting unit 213. In addition, the CPU 201 determines whether or not the detected attitude has changed from the previously detected attitude of the display control apparatus 200. When the posture has changed, a transition is made to S332, but otherwise a transition is made to S335.

In S332, the CPU 201 determines (updates) the movement angle ANG in accordance with the posture of the display control apparatus 200 detected in S331 and stores the movement angle ANG in the memory 202.

S333: Guide Hiding Process

In S333, the CPU 201 performs a guide hiding process of hiding the guides. Hereinafter, the guide hiding process that is executed in S333 will be described in detail with reference to the flow chart shown in FIG. 13A.

In S391, the CPU 201 determines whether the present state is a guide-displayed state where the guides 462 and 463 are being displayed. When the present state is the guide-displayed state, a transition is made to S392, but otherwise the guide hiding process shown by the present flow chart is ended.

In S392, the CPU 201 hides the guides 462 and 463 being displayed on the display 205. Once the process of S392 ends, the guide hiding process shown by the present flow chart ends.

In S334, the CPU 201 determines the display direction in accordance with the movement angle ANG determined (updated) in S332 and changes the display range of the VR image on the display 205. In other words, even when a posture change of the display control apparatus 200 causes the absolute value of the component in the horizontal direction of the movement angle ANG to change by the prescribed angle TH1 or more, the VR image to be displayed is not changed over to another VR image.

In S335, the CPU 201 determines whether or not an end operation of VR display has been performed with respect to the operating unit 206. When the operation has been performed, a transition is made to S336, but otherwise a transition is made to S322.

In S336, the CPU 201 changes the display state to the "ordinary display state". Once the process of S336 ends, all of the processes of the present flow chart end.

Changeover Setting Process: S305

Figure 13B:
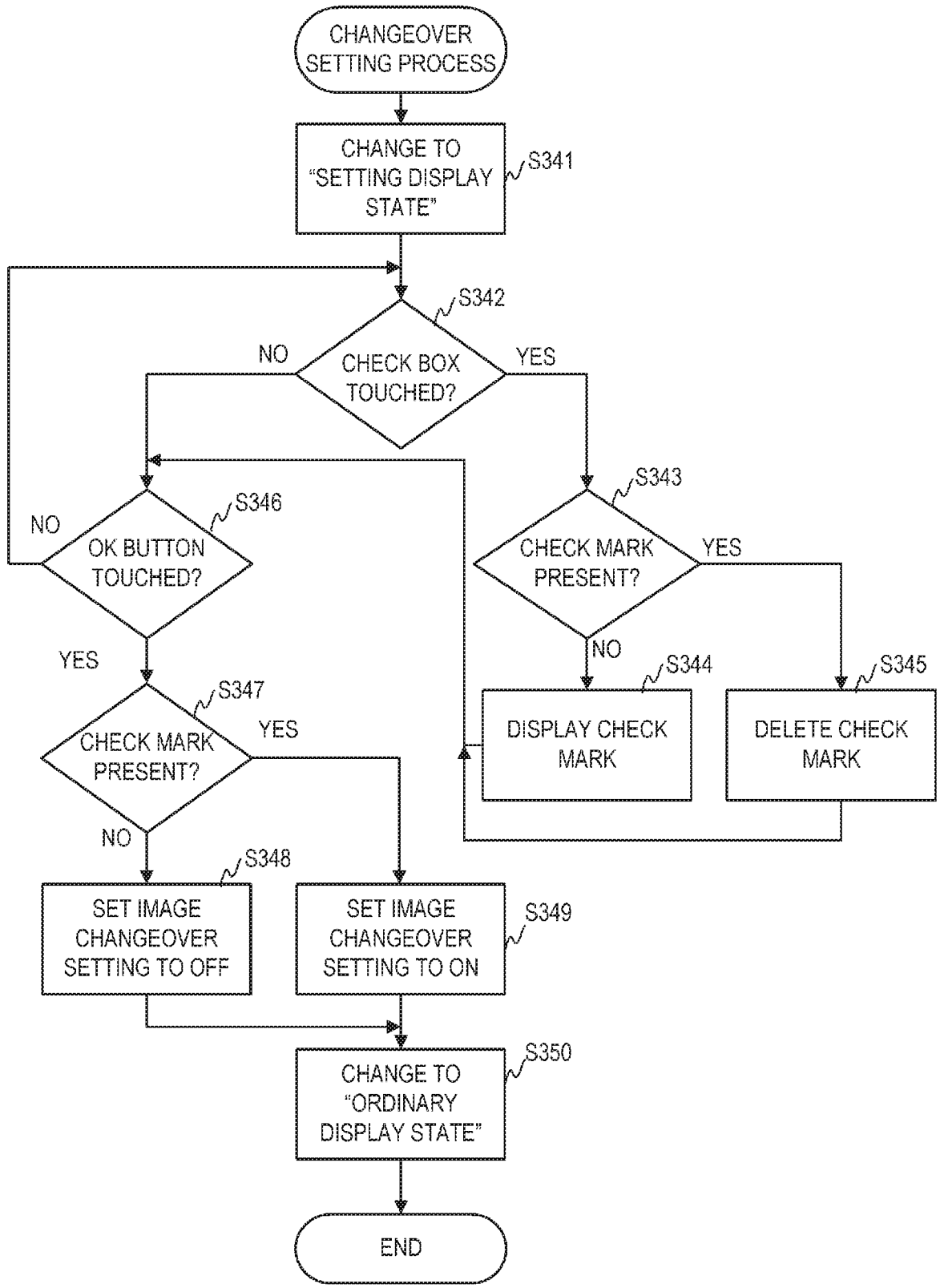
FIG. 13B is a flow chart showing a changeover setting process.

Hereinafter, the changeover setting process that is executed in S305 will be described in detail with reference to the flow chart shown in FIG. 13B. As described earlier, the changeover setting process refers to a process of setting whether or not the VR image to be displayed is to be changed over to another VR image by a user operation in the "VR display state".

In S341, the CPU 201 changes the display state of the display 205 to a "setting display state" from the "ordinary display state". FIG. 10B shows an example of the "setting display state" in which a setting region 491 is displayed on the display 205. In addition, the setting region 491 includes a check box 492 and an OK button 493.

In S342, the CPU 201 determines whether or not a touch operation of the check box 492 has been performed with respect to the operating unit 206. When the operation has been performed, a transition is made to S343, but when the operation has not been performed, a transition is made to S346.

In S343, the CPU 201 determines a presence or absence of a check mark in the check box 492. When there is a check mark in the check box 492, a transition is made to S345, but when there is no check mark, a transition is made to S344.

In S344, the CPU 201 displays a check mark in the check box 492.

In S345, the CPU 201 deletes the check mark in the check box 492.

In S346, the CPU 201 determines whether or not a touch operation of the OK button 493 has been performed with respect to the operating unit 206. When the operation has been performed, a transition is made to S347, but when the operation has not been performed, a transition is made to S342.

In S347, the CPU 201 determines a presence or absence of a check mark in the check box 492 of the display 205. When there is a check mark in the check box 492, a transition is made to S348, but when there is no check mark, a transition is made to S349.

In S348, the CPU 201 sets the image changeover setting to OFF and stores the setting in the memory 202.

In S349, the CPU 201 sets the image changeover setting to ON and stores the setting in the memory 202.

In S350, the CPU 201 executes a process of changing the display state of the display 205 to the "ordinary display state". Once the process of S350 ends, the changeover setting process shown by the present flow chart ends.

While the present embodiment adopts a configuration in which the VR image to be displayed is changed over to another VR image when the absolute value of the left-right component of the movement angle ANG is equal to or larger than the prescribed angle TH1, this configuration is not restrictive. For example, the present embodiment may be implemented by interchanging (mutually replacing) descriptions of the "left-right direction" and the "up-down direction" in the present embodiment. In addition, the descriptions of the "left-right direction" and the "up-down direction" in the present embodiment may be arbitrary directions. In other words, the VR image to be displayed may be changed over to another VR image when a component in an arbitrary direction of the movement angle ANG is set to or larger than the prescribed angle TH1 by a prescribed user operation. Furthermore, the user operation for changing the display range of the VR image described above is not limited to a slide operation and may be any operation such as a flick operation or a successive tap operation.

It should be noted that the display control apparatus 200 according to the present embodiment can be realized even when the descriptions of "equal to or larger" are replaced with "larger" and the descriptions of "equal to or smaller" and "within" are replaced with "smaller".

Effect

As described above, according to the present embodiment, a change to a display range of a VR image and a changeover (a change) of the VR image to be displayed to another VR image can be performed by a same user operation. Therefore, user operations when performing operations for both changing a display range of a VR image and changing the VR image itself can be streamlined.

According to the present invention, user operations when performing operations for both changing a display range of a VR image and changing over the VR image to be displayed to another VR image can be streamlined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-52902, filed on Mar. 20, 2019, which is hereby incorporated by reference herein in its entirety.

What is claimed is:

1. An electronic device configured to display a VR image on a display unit, the electronic device having a memory and at least one processor and/or at least one circuit to perform the operations of the following units:
    an operating unit configured to accept a user operation for moving touch position on the display unit;
    a posture detection unit configured to detect a change in a posture of the electronic device;
    a determining unit configured to determine a display direction based on a movement distance of the touch position or an amount of the change in the posture of the electronic device; and
    a display control unit configured to 1) control the display unit to display a partial region of a VR image in accordance with the display direction determined based on the amount of the change in the posture of the electronic device regardless of whether the display direction determined based on the amount of the change in the posture of the electronic device is larger than a predetermined angle or not, 2) control the display unit to display the partial region of the VR image in accordance with the display direction determined based on the movement distance of the touch position if the display direction determined based on the movement distance of the touch position is smaller than the predetermined angle and 3) control the display unit to change over to another VR image and display another VR image instead of displaying the partial region of the VR image if the display direction determined based on the movement distance of the touch position is larger than the predetermined angle.

2. The electronic device according to claim 1, wherein the determining unit determines the display direction based on further a movement direction of the touch position or an angle of the change in the posture of the electronic device.

3. The electronic device according to claim 2, wherein the display control unit controls the display unit to display the partial region of the VR image in accordance with the display direction determined based on the movement distance of the touch position if a value of a component in a horizontal direction of the movement distance of the touch position is smaller than a predetermined distance and
    wherein the display control unit controls the display unit to change over to another VR image and display another VR image if the value of the component in the horizontal direction of the movement distance of the touch position is larger than the predetermined distance.

4. The electronic device according to claim 2, wherein the display control unit controls the display unit to change over to another VR image and display another VR image if a value of a component in a horizontal direction of the movement distance of the touch position is larger than a first predetermined distance and a value of a component in a vertical direction of the movement distance of the touch position is smaller than a second predetermined distance.

5. The electronic device according to claim 2, wherein the display direction indicates a difference of angle from a reference direction in a VR space of the VR image.

6. The electronic device according to claim 1, wherein the display control unit controls the display unit to change over to another VR image which is selected depending on the movement direction of the touch position.

7. The electronic device according to claim 1, wherein the predetermined angle is set depending on a type of the VR image.

8. The electronic device according to claim 1, wherein the predetermined angle is a value in accordance with a valid image range of the VR image.

9. The electronic device according to claim 8, wherein in case where the valid image range is a range corresponding to a visual field of 360 degrees in a vertical direction and 360 degrees in a horizontal direction, the predetermined angle is larger than 360 degrees.

10. The electronic device according to claim 1, wherein the display control unit controls the display unit to further display information relating to a changeover of the VR image to be displayed to another VR image.

11. A method of controlling an electronic device that displays a VR image on a display unit, the method comprising:
    a step of accepting a user operation for moving touch position on the display unit;
    a step of detecting a change in a posture of the electronic device;
    a step of determining a display direction based on a movement distance of the touch position or an amount of the change in the posture of the electronic device; and
    a step of 1) controlling the display unit to display a partial region of a VR image in accordance with the display direction determined based on the amount of the change in the posture of the electronic device regardless of whether the display direction determined based on the amount of the change in the posture of the electronic device is larger than a predetermined angle or not, 2) controlling the display unit to display the partial region of the VR image in accordance with the display direction determined based on the movement distance of the touch position if the display direction determined based on the movement distance of the touch position is smaller than the predetermined angle and 3) controlling the display unit to change over to another VR image and display another VR image instead of displaying the partial region of the VR image if the display direction determined based on the movement distance of the touch position is larger than the predetermined angle.

12. A non-transitory computer readable medium that stores a program, wherein the program causes a computer to execute a method of controlling an electronic device to display a VR image on a display unit, the method including:
a step of accepting a user operation for moving touch position on the display unit;
a step of detecting a change in a posture of the electronic device;
a step of determining a display direction based on a movement distance of the touch position or an amount of the change in the posture of the electronic device; and
a step of 1) controlling the display unit to display a partial region of a VR image in accordance with the display direction determined based on the amount of the change in the posture of the electronic device regardless of whether the display direction determined based on the amount of the change in the posture of the electronic device is larger than a predetermined angle or not, 2) controlling the display unit to display the partial region of the VR image in accordance with the display direction determined based on the movement distance of the touch position if the display direction determined based on the movement distance of the touch position is smaller than the predetermined angle and 3) controlling the display unit to change over to another VR image and display another VR image instead of displaying the partial region of the VR image if the display direction determined based on the movement distance of the touch position is larger than the predetermined angle.

* * * * *